United States Patent [19]

Maresca, Jr. et al.

[11] Patent Number: 5,263,371
[45] Date of Patent: Nov. 23, 1993

[54] METHODS FOR TEMPERATURE-COMPENSATED LIQUID HEIGHT AND LEAK DETECTION MEASUREMENTS USING QUASI-STATIC REFERENCE SUBSYSTEM

[76] Inventors: Joseph W. Maresca, Jr., 780 Fife Way, Sunnyvale, Calif. 94087; James W. Starr, 200 Willow St., Bound Brook, N.J. 08805; Christopher P. Wilson, 9141 Alpine Rd., La Honda, Calif. 94020

[21] Appl. No.: 830,229

[22] Filed: Jan. 30, 1992

Related U.S. Application Data

[62] Division of Ser. No. 585,713, Sep. 19, 1990, Pat. No. 5,127,266.

[51] Int. Cl.$^5$ ............................................. G01F 23/28
[52] U.S. Cl. ................................. 73/290 V; 367/908; 367/99; 181/124; 181/402
[58] Field of Search ............. 73/290 V; 367/908, 108, 367/99; 181/123, 124, 400, 402

[56] References Cited

U.S. PATENT DOCUMENTS

| | | | |
|---|---|---|---|
| 2,869,108 | 1/1959 | Smith, Jr. | 73/290 V |
| 2,998,723 | 9/1961 | Smith, Jr. et al. | 73/290 V |
| 3,214,974 | 11/1965 | Altman et al. | 73/290 V |
| 3,693,445 | 9/1972 | Johnson | 73/290 V |
| 4,158,964 | 6/1979 | McCrea et al. | 73/290 V |
| 4,487,065 | 12/1984 | Carlin et al. | 73/290 V |
| 4,748,846 | 6/1988 | Haynes | 73/290 V |
| 4,805,453 | 2/1989 | Haynes | 73/292 |
| 4,890,490 | 1/1990 | Telford | 73/290 V |
| 4,928,525 | 5/1990 | Aderholt et al. | 73/290 V |
| 4,934,186 | 6/1990 | McCoy | 73/290 V |
| 5,036,703 | 8/1991 | Eriksson | 73/290 V |

FOREIGN PATENT DOCUMENTS

69024 5/1980 Japan ............................. 73/290 V

Primary Examiner—William A. Cuchlinski, Jr.
Assistant Examiner—Diego F. F. Gutierrez
Attorney, Agent, or Firm—Rosenblum, Parish & Isaacs

[57] ABSTRACT

A method for measuring the temperature-compensated change in the height of a surface of a liquid. The method positions an acoustic signal transducer for emitting and receiving acoustic signals below the surface of the liquid, positions a quasi-static reference device with a fiducial such that the fiducial lies within a predetermined range below the surface of the liquid, and positions one or more fiducials below the surface of the liquid to establish points separated by known distances. The transducer emits acoustic signals, and receives their reflections. The travel times of the reflections from the liquid surface and the fiducials are used to calculate changes in travel times during the measurement period, to estimate the speed of sound in the liquid, to correct for temperature-induced changes in the travel times, and to obtain a temperature-compensated change in travel time to the liquid surface. The temperature-compensated change in the height of the surface of the liquid during the measurement period is calculated using the product of the estimate of the speed of sound in the liquid and the temperature-compensated change in travel time to the liquid surface. The presence of a leak in a storage tank may be detected by converting the temperature-compensated change in the height of the surface of the liquid to temperature-compensated volume change using the known shape of the tank and liquid height, and then comparing the temperature-compensated volume change to a threshold value to determine whether the tank is leaking.

8 Claims, 18 Drawing Sheets

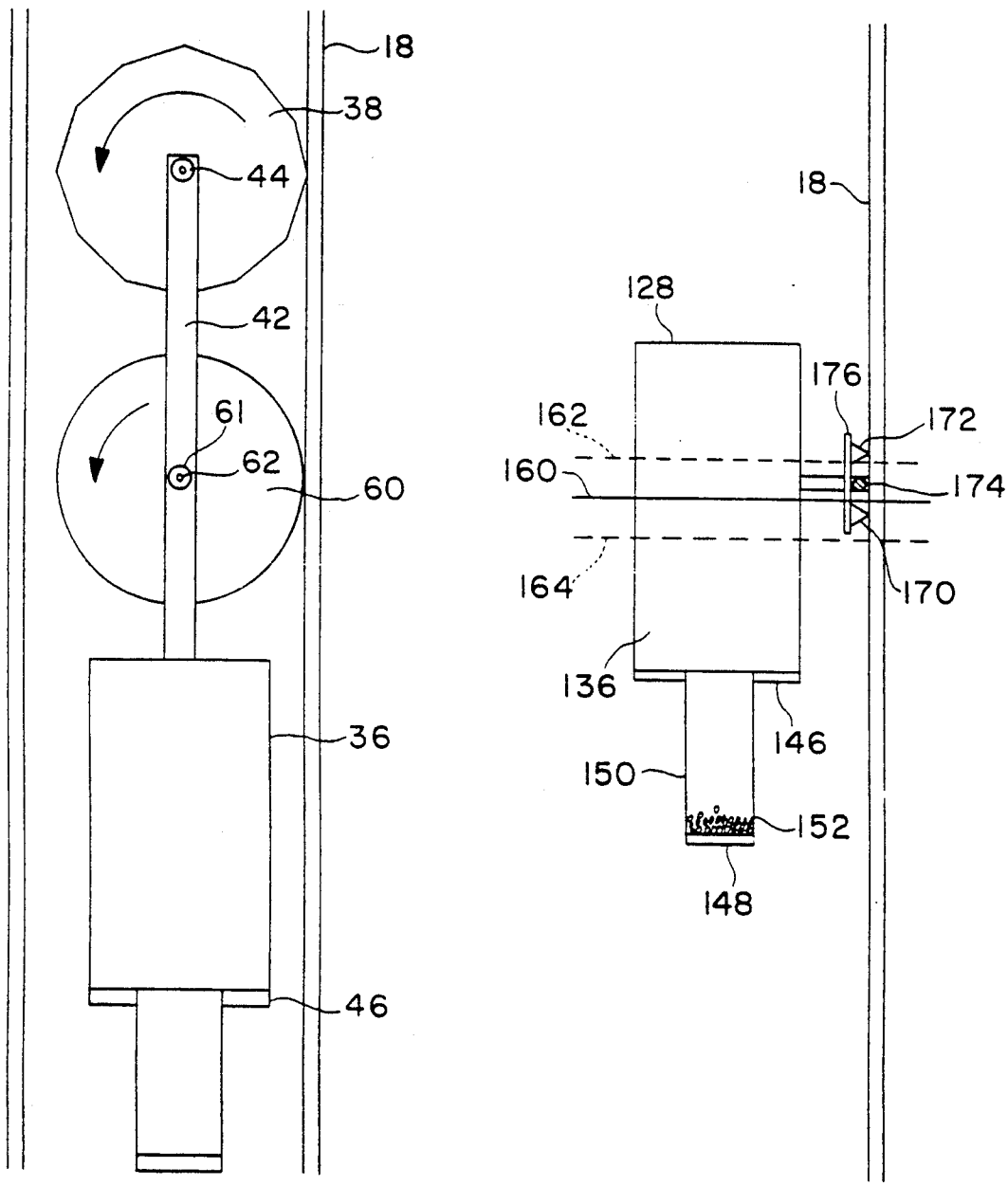

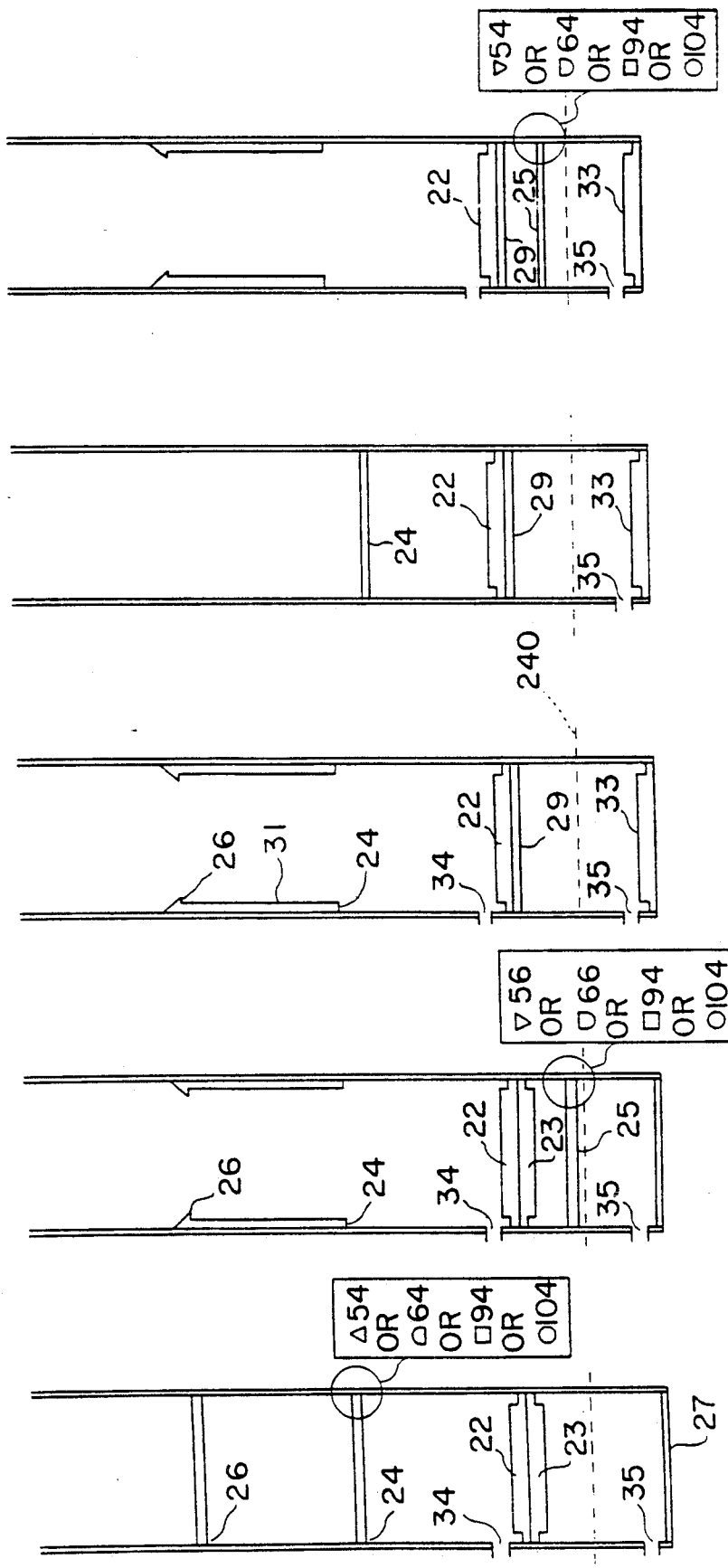

FIG. 23a
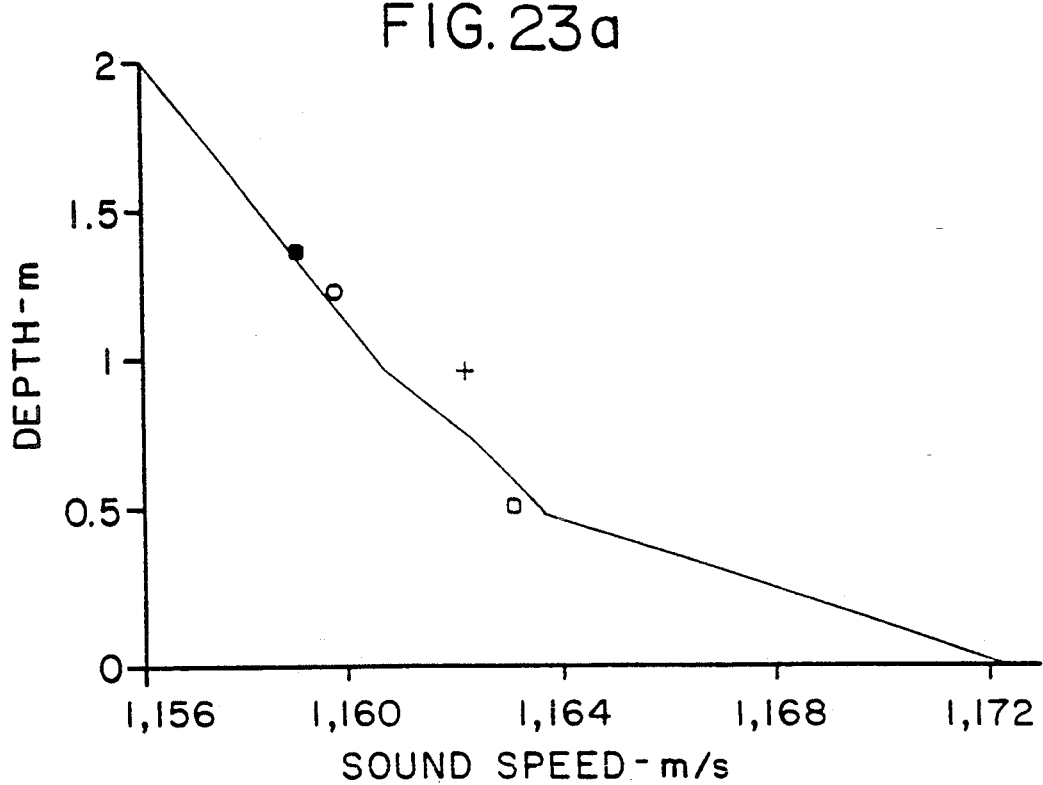
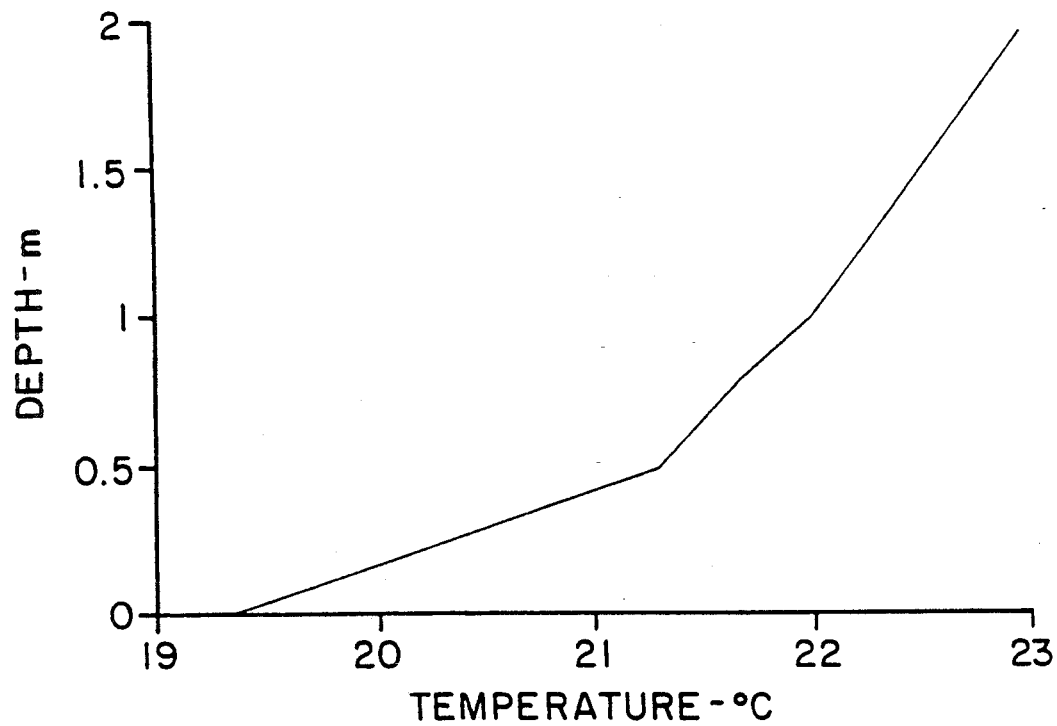
FIG. 23b

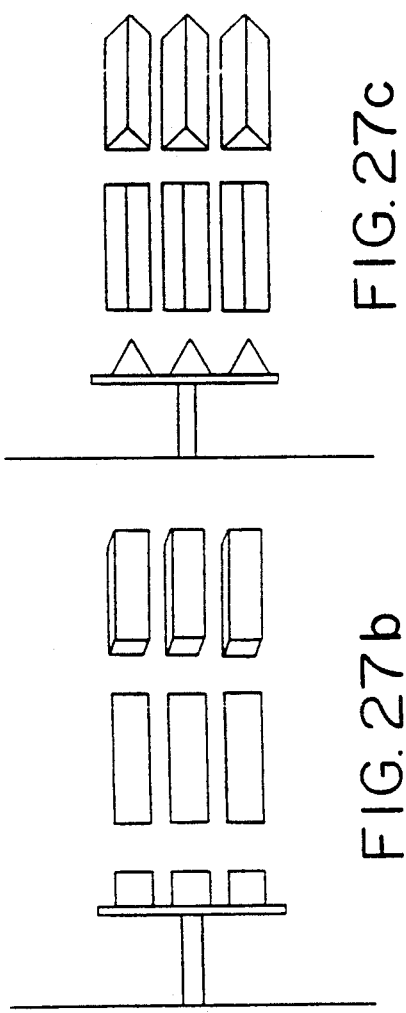
FIG.27a
FIG.27b
FIG.27c
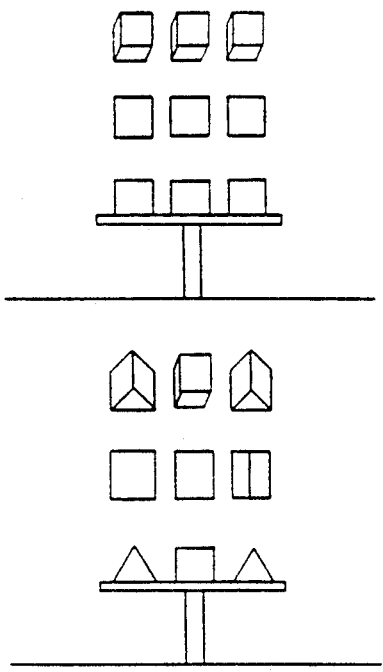
FIG.27g
FIG.27f
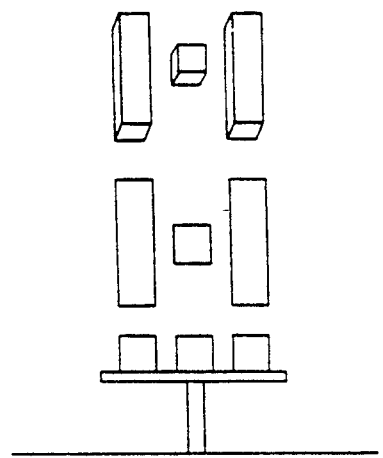
FIG.27e
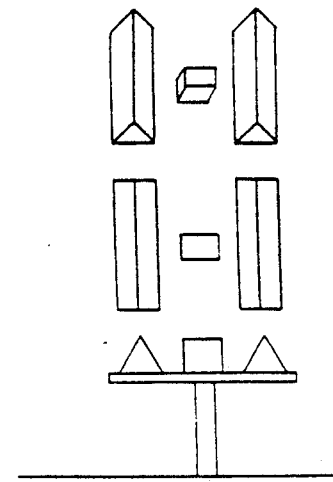
FIG.27d

METHODS FOR TEMPERATURE-COMPENSATED LIQUID HEIGHT AND LEAK DETECTION MEASUREMENTS USING QUASI-STATIC REFERENCE SUBSYSTEM

This is a divisional of copending application Ser. No. 07/585,713 filed on Sep. 19, 1990 now U.S. Pat. No. 5,127,266.

BACKGROUND OF THE INVENTION a. Field of the Invention

The present invention relates generally to automatic tank gauging (ATG) systems that use an acoustic or ultrasonic sensor system to measure level and temperature, as well as changes in level and temperature, in liquids stored in underground and aboveground tanks; it applies particularly to novel reference subsystems and methods for monitoring (1) the level of that liquid, (2) small changes in the level and temperature of that liquid, (3) the level of a second liquid that is immiscible with the first liquid and that is usually located near the bottom of the tank, and (4) leakage from the tank.

b. Brief Discussion of the Prior Art

Automatic systems for making level and volumetric measurements in storage tanks are well known in the petroleum and chemical industries and are generally included, under the category of automatic tank gauging systems, in the United States Environmental Protection Agency (EPA) regulation for underground storage tanks containing petroleum liquids and other chemical liquids considered hazardous to the environment. Petroleum and chemical liquids are referred to as "product" in order to differentiate them from water, another liquid that may be present in the tank at the same time (water, which accumulates at the bottom of the tank, is an undesired entity).

The EPA presently gives three options for tank testing. The first option is an ATG, which must (1) do inventory control (i.e., make water-level and product-level measurements accurate to ⅛ in.) and (2) perform a leak detection test (i.e., detect leaks as small as 0.2 gal/h with a probability of detection ($P_D$) of 95% and a probability of false alarm ($P_{FA}$) of 5%). The ATG reconciles product inventory on a monthly basis, using the product-level measurements combined with dispensing and delivery data obtained by other means. In addition, the ATG must be used monthly to perform a leak detection test. The second option is a volumetric or "tank tightness" test, which, like an ATG, must make inventory control measurements of water level and product level accurate to ⅛ in. and must perform a leak detection test. It must, however, be able to detect leaks twice as small as those detectable by an ATG, specifically, 0.1 gal/h with a $P_D$ of 95% and a $P_{FA}$ of 5%. If one chooses this more stringent option, the minimum time interval between tests required by the regulation is once a year. The EPA specifies a third option under Other Methods in the regulatory document; to satisfy this option one must test the tank monthly with any method that can detect a release of 0.2 gal/h using a $P_D$ of 95% and a $P_{FA}$ of 5%.

An ATG can be used to satisfy any of these three options as long as it meets the criteria defined for that option by the EPA. Moreover, the present invention, when used for leak detection, may be used either as an ATG or a tank tightness test.

A wide variety of ATGs have been developed and are currently on the market. A few of these use acoustic systems to measure product level and water level, both for inventory control and for conducting a leak detection test. The acoustic frequency selected for the system is such that an acoustic pulse will propagate in a liquid but not in a gas and will be reflected from any strong density discontinuity, such as the interface between a liquid and a gas, the interface between two immiscible liquids (e.g., gasoline and water), or a solid object (e.g., brass, steel, or nylon). When the interface is between a gas and a liquid, almost all of the acoustic energy is reflected; with a liquid-liquid interface, or a reflecting target (known as a "fiducial") that is narrower than the acoustic beam, some of the acoustic energy is reflected and some continues to propagate toward the liquid surface (in most systems, the acoustic transducer is placed on or near the bottom of the tank and pointed upward). If the average speed of sound over the propagation path is known, the height of the liquid above the transducer can be estimated from the time it takes for an acoustic pulse to travel back and forth once between the transducer and the product surface. The speed of an acoustic pulse through liquids such as those found in storage tanks depends on the temperature and chemical composition of the liquid. For a given liquid, the speed is directly proportional to the temperature over the range of ambient product temperatures, which is similar to the range of ground and air temperatures. Thus, the round-trip travel time between the transducer and the surface will depend on the vertical temperature profile of the liquid in the tank at the time of the measurement. Experimental measurements made in storage tanks show that a wide range of temperature profiles can exist (FIG. 1). Most ATGs use a calibration target located at a known distance from the transducer to estimate the propagation speed (i.e., sound speed) within a liquid medium; this is a widely accepted and widely published method, particularly in underwater sound measurements. The ATG makes an estimate of the average sound speed between the transducer and the surface from the time it takes for an acoustic pulse to travel round trip between the transducer and a solid reference target, such as fiducial 210, that is located a fixed and known distance above the transducer and below the liquid surface (FIG. 2); the time is then converted to distance. What is not included in this average sound speed is that portion of the liquid between the fiducial and the surface. Therefore, if the temperature in this layer differs from the average temperature in the layer between the transducer and the fiducial, errors in estimating the speed of sound through the liquid may occur, and this will affect the accuracy of the liquid-level estimate made by the system. If the acoustic transducer is located below the water/product interface, as shown in FIG. 3, the estimate of the sound speed obtained from the fiducial 210 will not reflect the propagation speed through product alone, but will include the effects of the water. (Accuracy also depends, of course, on the performance characteristics of the measurement system itself.)

An acoustic ATG is also used to measure the level of the water that accumulates at the bottom of a storage tank. It is generally understood that the maximum level of water that an ATG must be capable of measuring is 4 in. A higher water level is likely to interfere with or contaminate the liquid that is being dispensed from the tank. If water is immiscible with the liquid in the tank, which is the case with petroleum, the product most commonly stored in underground tanks, an acoustic ATG can be used to measure it. In principle, this measurement can be made in two ways. The first way is to position the transducer below the water/product interface and measure the round-trip travel time of the acoustic signal reflected from the interface (FIG. 4). The travel time is converted to distance by selecting an average value of sound speed through water from published tables. This method is more than sufficient for providing a level measurement accurate to within ⅛ in. For a number of reasons, this measurement is difficult to make if the water/product interface is too close to the transducer, and, as a consequence, this measurement approach has not been used commercially to measure the water level near the bottom of the tank. The second way is to position the transducer above the water/product interface and measure the difference in the travel time for an acoustic signal to propagate (1) from the transducer to the product surface to the water/product interface, then back to the surface and back again to the transducer (FIG. 5(a)); and (2) from the transducer to the product surface to the bottom of the tank, then back to the surface and back again to the transducer (FIG. 5(b)). The water level can be estimated from this first propagation path alone if the height of the transducer from the bottom of the tank is known and if the average sound speed over the entire propagation path can be estimated. Because temperature gradients are largest near the bottom and top of the liquid in the tank, errors in estimating sound speed occur in the liquid layer above the fiducial closest to the surface and the layer below the transducer. These errors can sometimes be large.

Leak detection is difficult because the thermal expansion and contraction of the volume of the product in the tank must be accurately estimated and removed from the volume changes derived from the level changes measured with an ATG. Accurate temperature compensation is difficult because the rate of change of temperature and the volume of the product in the tank, which is usually proportional to the circular cross-section of the tank, are not uniform with depth. Typically, when new product is delivered to an underground storage tank, there is a significant temperature difference between the new and extant products. This temperature difference arises because the product stored in an underground tank is likely to be in equilibrium (or nearly so) with the surrounding soil and backfill material, while the delivered product may have been transported in a tanker truck exposed to ambient air and sunlight conditions for a long time. Further, the tanker may have obtained the product from an above-ground tank, whose contents might have been much warmer (or colder) than the temperature of the ground where the receiving tank is located. When products of different temperatures are mixed, a thermal separation occurs with (usually, but not always) the warmer product rising to the top as the colder product settles to the bottom, with an infinite variety of different temperature profiles or "thermal gradients" between the top and bottom of the tank 10, such as illustrated in FIG. 1. Depending on the volume capacity of the storage tank, the thermal properties of the soil and backfill and the differences in temperature between the product in the tank and the soil and backfill, it can take many days for the combined products to reach near-equilibrium conditions again. In this attempt to reach a near-equilibrium condition, the rate of change of temperature may differ significantly over the depth of the tank. Because acoustic measurement systems are affected by the temperature over the entire propagation path between the transducer and the surface, they can be used to vertically integrate the changes in temperature over the depth of the product in the tank. When these measurements are made over a period of time, an acoustic system is particularly good for measuring the average change in temperature of the product within the tank.

An ATG can be used to conduct a volumetric leak detection test if both the average change in temperature of the product in the tank, which is weighted in the vertical by the volume of the product as a function of height above the bottom of the tank (i.e., by the cross-sectional area of the tank), and the change in level of the product can be measured over a period of time. The average thermally induced volume change is estimated by taking the mathematical product of the average volumetrically weighted temperature change, the coefficient of thermal expansion of the liquid, and the total volume of the liquid in the tank. When measurements are made in a partially filled tank, the average volume change is estimated from the average liquid-level change by means of a height-to-volume conversion factor determined from the tank geometry. (In an overfilled tank, volume change cannot be estimated from a height-to-volume conversion based on tank geometry, but must be measured experimentally.) The average temperature-compensated volume rate is calculated by subtracting the average thermally induced volume change from the average volume change. On the average, if the data are properly sampled to avoid aliasing the surface and internal waves that are frequently present in the tank, and if the liquid level changes due to the structural deformation of the tank and to the evaporation and condensation within the tank are also compensated for, this net volume change should, in a nonleaking tank, be equal to zero. The temperature-compensated volume rate is then compared to a predetermined threshold volume rate to determine whether the tank should be declared leaking. The performance of the leak detection system in terms of $P_D$ and $P_{FA}$ can be estimated if one generates a histogram of many individual leak detection tests on a nonleaking tank over a wide range of environmental conditions that affect the performance of the method, such as ground and product temperature conditions, and if one knows the relationship between the volume changes due to a leak and the volume changes due to any other physical mechanisms active in the tank environment. Acoustic ATG systems typically make an estimate of the average vertical temperature and average level change from a sound-speed estimate made with a fiducial located below the surface of the product. This fiducial is required so that one can compensate for the effects of temperature and level on the round-trip travel time of the acoustic pulse. When the average temperature change is estimated in this way, the temperature changes are not weighted by volume, and large temperature changes near the top and bottom of the tank, where the height of the product is great in comparison to its volume, can result in large differences between the depth-averaged temperature and the depth-averaged volumetrically weighted temperature. Therefore, the closer the fiducial is to the surface, the better the estimate of the average temperature and level changes will be. If the fiducial is located too far below the surface, it is likely that there will be large errors in the measurement of the liquid-level changes. Ideally, the fiducial should be collocated with the surface, but then it would be impossible to measure the acoustic returns from both the surface and the fiducial and to distinguish between them. Generally, a fiducial cannot be placed any closer to the surface than 1 to 2 in. This constraint is imposed by the width of the acoustic pulse, its reverberation, and the time required to process the data.

In U.S. Pat. Nos. 4,748,846 and 4,805,453, Haynes describes an ultrasonic ATG system and several methods for measuring the level of the product and water in a tank, a method for measuring the average sound speed through the product in a tank and the average temperature of this product, and a method for detecting theft or leaks in a tank. Haynes uses a number of fixed references or fiducials, rigidly and permanently attached to a staff that is inserted vertically into the tank, as shown in FIG. 2. The fiducials are separated by some predetermined distance, and preferably are equidistant from one another. The number of fiducials is not specified, nor is the spacing between them, but in a tank that is 8 ft in diameter there are typically 8 fiducials spaced approximately 12 in. apart. More fiducials can be used, but the spacing should not be so close that it becomes an intractable measurement problem to determine which acoustic return is associated with which fiducial or to determine which return is from the surface. Multiple returns from lower fiducials have round-trip travel times similar to the first return from higher fiducials, and the multiple returns from the fiducials and the surface have the same arrival times as the returns from the fiducials themselves. In addition, there is the possibility of missing a weak return from any one or more fiducials; this results in a counting (i.e., location) error. Furthermore, the minimum spacing, as determined from the duration of the acoustic pulse, reverberation, and processing time, is limited to 1 to 2 in. As a consequence, the fiducial closest to the product surface may be anywhere between 2 and 12 in. from it.

Haynes uses a single fiducial, the one that is closest to the surface, to measure product level and water level, to measure average temperature, and to make an estimate of the temperature-compensated volume for the purpose of leak detection. The transducer is located near the bottom of the tank, but above the maximum height of any water that might accumulate there. The system uses a threshold detection approach to measure the round-trip travel time of the acoustic signals reflected from all of the fiducials, the surface, the water/product interface, and the bottom of the tank. Haynes uses either of the configurations shown in FIG. 5 to estimate the water level; he states that when the water/product interface is close to the transducer, the configuration shown in FIG. 4 does not work.

There are a number of problems with the ATG system described by Haynes that affect the accuracy of the product-level and water-level measurements, as well as the leak detection test itself. All of the measurements require that both the surface and the fiducial immediately below the surface be identified. Multiple echoes can cause mistakes in finding the surface or the uppermost submerged fiducial. A secondary echo that has a round-trip travel time less than but very close to that of the first acoustic pulse may be detected instead of the first return of the pulse, resulting in an erroneous measurement of the distance between the transducer and the fiducial or surface. Since errors of 0.01 to 0.001 in. are significant, large errors can be made in estimating the sound speed, which is in turn used to make estimates of the product level, temperature, and water level. In general, a fiducial located within 12 in. of the surface will usually result in an estimate of the surface height accurate to within $\frac{1}{8}$ in. or better. However, even a fiducial located an average of 6 in. away from the surface will produce unacceptably large systematic errors in the leak detection approach. Significant temperature gradients and, therefore, soundspeed gradients occur in the layer immediately below the surface, and thus placement of a fiducial more than 2 to 3 in. from the surface can result in large errors in the measurement of the level changes. In addition, an error in leak detection can occur because the temperature changes are not volumetrically weighted by the cross-sectional area of the tank. The approach to making water-level measurements that is shown in FIG. 5(a), where the pulse is reflected back to the transducer via the route surface-interface-surface, is susceptible to errors in that it is difficult to distinguish the interface return from the primary and secondary fiducial and surface returns. Errors in measuring the distance between the transducer and the interface are also likely to occur, because the speed of sound in the area between the transducer and the interface is not known, nor is the speed of sound between the uppermost submerged fiducial and the surface known.

In a number of other types of liquid-level measurement devices, floats have been used to track surface fluctuations. For example, U.S. Pat. No. 4,158,964, issued to McCrea et al., disclosed an ultrasonic level-measurement system that is very different from Haynes's acoustic system. In the McCrea invention, an ultrasonic pulse is transmitted vertically through a waveguide made of a homogeneous aluminum alloy having a low thermoelastic coefficient. Permanent magnets are located at the top and bottom of the waveguide and on a donut-shaped float that is concentrically positioned about the waveguide and that is free to move up and down with liquid-level changes. These magnets produce a low-level, bipolar voltage pulse that is generated across the waveguide as the acoustic pulse transmitted along the waveguide passes the magnet. The permanent magnets at the top and bottom of the tube are used as a calibration reference to interpret the speed of the pulse in the waveguide. The magnets in the float are used to determine the position of the float along the waveguide.

SUMMARY OF THE PRESENT INVENTION

It is an object of the present invention to provide a method, and several devices that implement this method, for reliably detecting small leaks in tanks used to store liquids.

Another object of the present invention is to provide a method, and several devices that implement this method, for measuring the level of product in a storage tank containing a liquid.

Another object of the present invention is to reduce the number of fiducials in an ATG device in such a way as to (1) minimize the number of secondary acoustic echoes that make it difficult or impossible to correctly identify the return from the fiducials, the product surface, and the water/product interface, and (2) still make accurate measurements of product temperature, product level, and water level, as well as precise measurements of product-level changes and temperature changes, and thus to conduct a leak detection test that meets or exceeds the present EPA performance standards.

Another object of the present invention is to provide a method whereby a novel quasistatic, floating reference device that has fiducials attached to it, that is used for calibration purposes, and that is always located as close to the liquid surface as desired rigidly attaches itself to a vertical support inserted into the tank and remains fixed for the precise measurement of product-level and temperature changes required for leak detection, but changes position when the level of liquid in the tank changes by a predetermined amount.

Another object of the present invention is to provide a method, and several devices that implement this method, for measuring the average speed of sound in a layer of liquid immediately below the surface.

Another object of the present invention is to provide several methods of accounting for variations in sound speed that occur as an acoustic signal passes through a fluid of varying density, as would be required for accurate product-level and leak-detection measurements within a storage tank containing a liquid.

Another object of the present invention is to provide a method, and several devices that implement this method, for measuring the average change in the temperature of a liquid product within a storage tank and compensating for the thermal expansion and contraction of that product during a leak detection test.

Another object of the present invention is to provide a method, and several devices that implement this method, for measuring the average change, weighted volumetrically by the cross-sectional area of the tank, in the temperature of a liquid in that tank.

Another object of this invention is to provide a method, and several devices to implement this method, for measuring the level of the water accumulated at the bottom of a storage tank that contains a liquid immiscible with water by means of an acoustic transducer, mounted either above or below the water/product interface, that emits a signal that is reflected from the water/product interface.

A final object of this invention is to provide a method, and several devices that implement this method, for measuring the level of the water at the bottom of the tank without using the acoustic backscatter from the water/product interface.

Briefly, the preferred embodiment of the present invention comprises an automatic tank gauging system having a quasi-static reference subsystem (a floating fiducial device) for measuring product level and leaks in storage tanks containing liquids. The tank gauging system includes a probe assembly, a transducer controller mounted at the top of the probe assembly, and an external system controller in electrical communication with the transducer controller. The probe assembly is comprised of (1) an insertion tube, (2) an acoustic transducer mounted toward the bottom of the tube and aimed toward the surface of the product, (3) an acoustic transducer aimed toward the bottom of the tank and mounted below the upward-aimed transducer and above the maximum level that water may accumulate at the bottom of the tank, (4) at least two fiducials, or fixed references, positioned below the liquid in a half-filled tank and at defined intervals with respect to the acoustic transducer, (5) a temperature sensing device positioned near the bottom of the tank, and (6) a quasi-static reference subsystem having at least one fiducial that provides a fixed reference point when the product level in the tank is in equilibrium (i.e., not fluctuating) and that adjusts its position with respect to the transducer when the level rises or falls by a predetermined increment. The preferred embodiment of the quasi-static reference device is a float having a predetermined specific gravity, a wheel having a multifaceted magnetized circumference wherein each facet of the wheel has a length approximately corresponding to the predetermined incremental change in product level, and which wheel keeps the quasi-static reference device affixed to the inner wall of the tube when the product is in a state of equilibrium, and a support member for the wheel and for the addition of a guide magnet (or "slider" magnet), if necessary, that keeps the float vertically aligned. Also attached to the float are one or more fiducials for use as reference for the acoustic transducer. When in operation, the upper transducer emits a series of acoustic pulses upward through the probe assembly and through the product; these pulses are reflected by the fixed and quasi-static reference fiducials and by the surface of the product. The lower transducer emits a series of acoustic pulses downward through the probe assembly and through the product and any water that has accumulated at the bottom of the tank; these pulses are reflected by the water/product interface and the bottom of the probe assembly.

The transducer controller generally collects data at 50 to 100 Hz, averages the data to 1 Hz or less, computes several data quality indices, and transfers the data and the indices to the external system controller for further reduction, analysis, and storage. The external controller generally averages the data to between 0.0167 and 0.0833 Hz (1 and 5 min/sample, respectively) for measurement of the average liquid level, the average water level, the average sound speed between all fixed and quasi-fixed fiducials and the transducer, the change in level of the liquid surface over time, and the change in temperature of the product over time averaged over the entire vertical extend of the tank after the temperature has been weighted by the cross-sectional area of the tank.

Although the present invention is primarily designed for use in the testing of underground storage tanks, it is not limited to that usage and could be easily be applied to testing above-ground storage tanks as well.

BRIEF DESCRIPTION OF THE DRAWINGS

FIG. 15 illustrates a third alternative embodiment of the quasi-static reference device shown in FIG. 7, comprised of a magnetic wheel located above the surface of the liquid and on the support that connects the pinwheel to the float;

FIG. 16 illustrates a first alternative embodiment of the probe assembly shown in FIG. 7; the two circular fiducials affixed to the vertical mount in FIG. 7 are replaced by two fiducials comprised of a long, thin bar having one of four different cross-sectional shapes, as shown;

FIG. 17 illustrates a second alternative embodiment of the probe assembly shown in FIG. 7; the addition of a bar-type fiducial such as that in FIG. 16 is located below the transducer and above the maximum level of water that may accumulate at the bottom of the tank;

FIG. 18 illustrates a third alternative embodiment of the probe assembly shown in FIG. 7; an upward-aimed transducer located below the nominal level at which water may accumulate at the bottom of the tank replaces the downward-aimed transducer of FIG. 7;

FIG. 19 illustrates a fourth alternative embodiment of the probe assembly; an upward-aimed transducer located below the nominal level at which water may accumulate at the bottom of the tank replaces the downward-aimed transducer of FIG. 7, and two bar-type fiducials such as those in FIG. 16 replace the two circular fiducials affixed to the vertical mount;

FIG. 20 illustrates a fifth alternative embodiment of the probe assembly; an upward-aimed transducer located below the nominal level at which water may accumulate at the bottom of the tank replaces the downward-aimed transducer of FIG. 7, and a bar-type fiducial such as that in FIG. 16 is placed below the transducer and above the maximum level of water that may accumulate at the bottom of the tank;

FIG. 23 illustrates (a) the computed sound speed profile in a gasoline tank filled to 78.7 inches corresponding to (b) the measured temperature profile;

FIG. 24 illustrates a fourth alternative embodiment of the quasi-static reference device shown in FIG. 7 that replaces the magnetic pinwheel device shown in FIG. 7 with a magnet-fulcrum subsystem that moves the reference device up and down the wall of the vertical mount;

FIGS. 27a through 27g illustrate the preferred embodiment and six alternative embodiments of the magnet and the upper and lower fulcrums of the quasi-static reference devices shown in FIGS. 24 through 26;

DESCRIPTION OF THE PREFERRED EMBODIMENT

Figure 6:
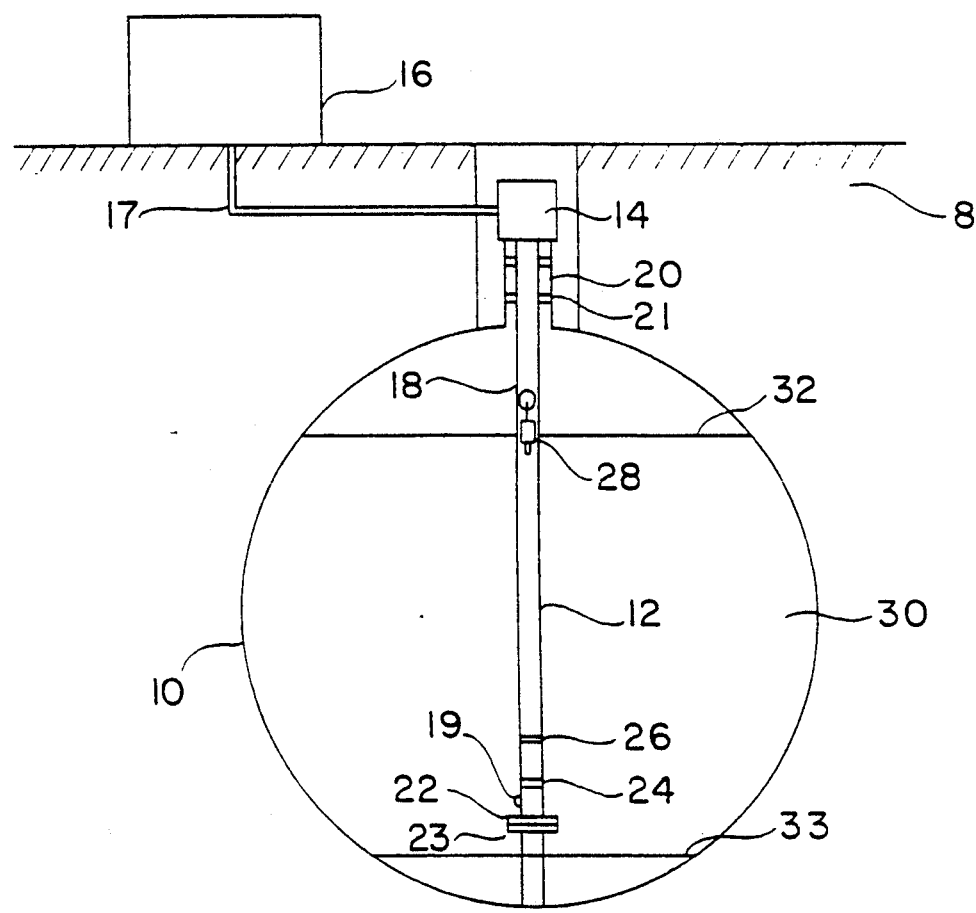
FIG. 6 illustrates the preferred embodiment of the automatic tank gauging system of the present invention.

An automatic tank gauging system and a volumetric leak detection system (tank tightness test) are illustrated in FIG. 6 as they would be used in an underground 8 storage tank 10 in accordance with the preferred embodiment of the present invention. The ATG has three main components: the probe assembly, shown as 12, a transducer controller 14, and a system controller 16. The transducer controller 14, which is mounted toward the top of the assembly 12 within an explosion-proof housing, controls the acoustic transducers 22, 23 and the temperature sensor 19. The system controller 16 is mounted to an above-ground support and is in electrical communication with the transducer controller 14 through a cable 17. The cable 17 carries power and command data from the system controller 16 to the transducer controller 14, and acoustic and temperature data from the transducer controller 14 back to the system controller 16. The cable is shown as fixed underground, but need not be. A cable is not necessary. The system controller and transducer controller can communicate telemetrically, with the transducer controller having a self-contained power supply.

The transducer controller 14 contains the pulse waveform shaping, transmitting and receiving, and digital preprocessing electronics for the ATG system. The system controller 16 contains the remainder of the hardware and software necessary to control the desired operational modes from the transducer controller 14, acquire the acoustic and temperature data, process the data in terms of product level, water level and leak rate, and display the results. The system controller 16 can also be equipped to control other sensor systems, such as those that provide overfill protection and alert, pipeline leak detection, detection of leaks in the annular space of a double-wall tank, detection of petroleum floating on the groundwater outside the tank, and detection of vapors in the soil and backfill outside the tank.

The probe assembly 12 is further comprised of a 2.0-in.-diameter tube 18 with ferromagnetic properties, preferably made of stainless steel, that is inserted into a riser 20 typically having a 2- to 4-in. diameter, an acoustic transducer 22 mounted toward the bottom of the tank and facing upward, another acoustic transducer 23 mounted toward the bottom of the tank, two fixed fiducial references 24 and 26 positioned at defined intervals with respect to the transducer 22, a temperature sensor 19 mounted mid-way between the transducer 22 and the lower fiducial 24, and a quasi-static fiducial reference device 28, which provides a fixed reference point when attached to the wall of the tube and which adjusts its position with respect to the transducer 22 when the fluid level in the tank rises or falls by a predetermined increment. The quasi-static reference device 28 is further described below with particular reference to FIG. 7. The term quasi-static indicates that the device 28 operates both as a float, which changes its position within the tube 18 when the height of the product 30 changes by a predetermined amount, and as a fixed reference point with respect to the surface 32 of the product.

Figure 7:
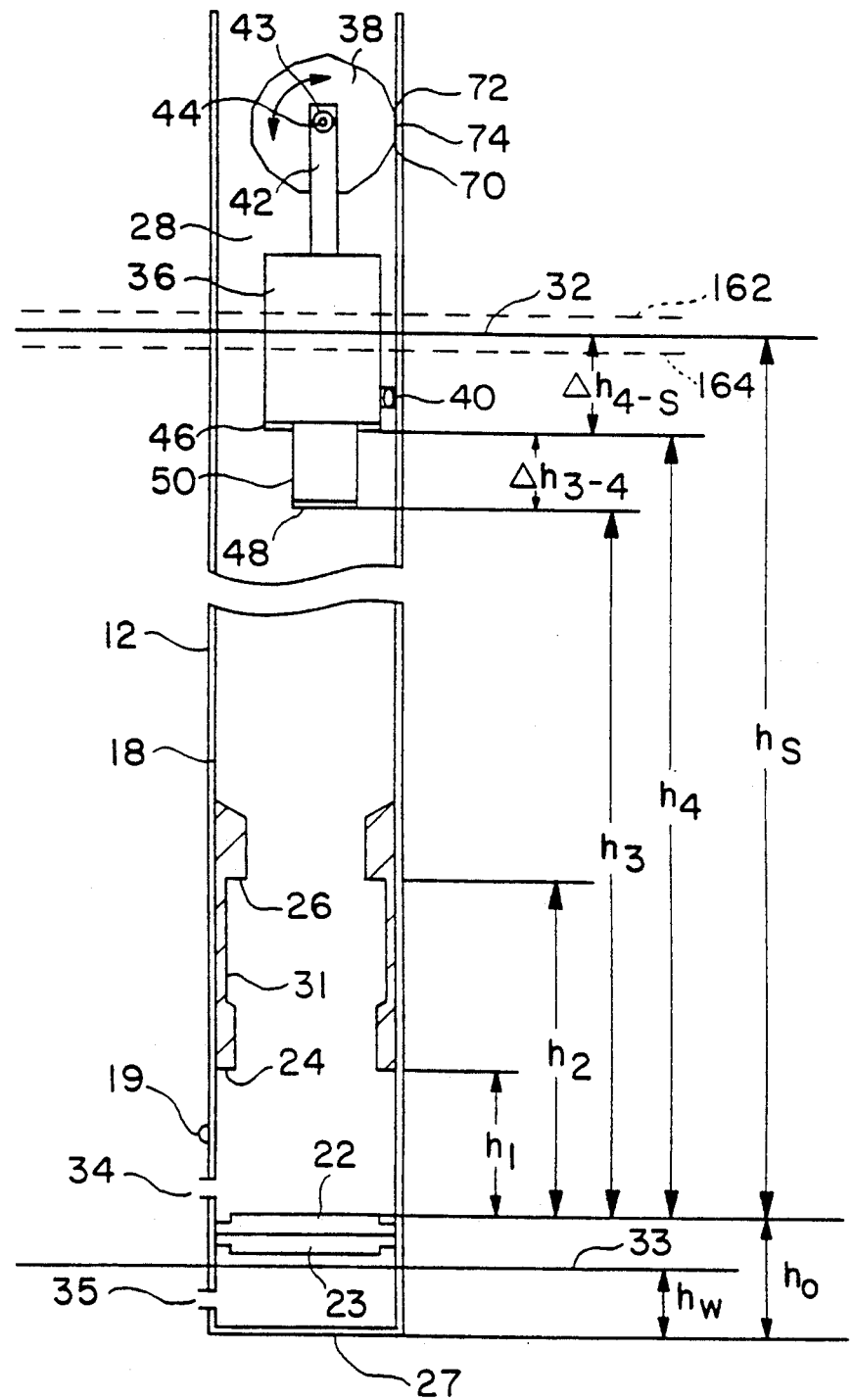
FIG. 7 is a cross-sectional view of a probe assembly, with the middle section cut away, and a quasi-static reference in accordance with the preferred embodiment of the present invention.

FIG. 7 further illustrates the probe assembly 12, shown with the middle section cut away so as to better illustrate the relationship between the transducer 22, the fixed references 24 and 26, and the quasi-static reference device 28. The tube 18 is substantially the same as the one illustrated in FIG. 6, with the exception of the inlet/outlet valves 34 and 35, which allows fluid from the tank to flow into the tube 18. One advantage of the present invention is that the entire reference system (the transducer 22 and references 24, 26, 46, and 48) is contained within the tube 18, rather than extending from the outside of the tube as is common in the prior art. The fact that this reference system is self-contained makes the ATG easier to handle when it is being inserted in or removed from the tank 10; it makes the device less likely to be damaged; and it provides a more controllable environment.

The transducer 22 is in electrical communication with the transducer controller 14 (FIG. 6) by means of a conductor (not shown) traversing the length of the tube 18. As noted above, communication may also be telemetric. The transducer 22 receives command data from the transducer controller 14 and transmits a series of accurately timed acoustic pulses up the probe, through the product, and to the various fiducials. Fiducials 24 and 26 (FIG. 7) comprise the bottom circumference of two concentric thin-walled nylon tubes separated in the vertical by a known distance; the nylon sleeve 31 with fiducials 24 and 26 fits into the ferromagnetic tube that holds the probe assembly. Fiducial 24, $F_1$, is preferably positioned at a height, $h_1$, about 18 in. above the bottom of an 8-ft-diameter tank, while fiducial 26, $F_2$, is preferably positioned at a height, $h_2$, about 30 in. above the bottom of the tank. The positioning of these fiducials, which varies depending on the diameter of the tank, will be further explained below. In operation, acoustic pulses transmitted by the transducer 22 are reflected from the fiducial references 24 and 26 and the surface 32 of the product in the tank.

The quasi-static reference device shown in FIG. 7 is comprised of a cylindrical float 36, a magnetized pinwheel 38, and a support 42 that links the wheel to the other components of the device. The purpose of the cylindrical float is to provide buoyancy for the reference device. The purpose of the magnetized pinwheel is to provide a means of incrementally changing the vertical position of the reference device as the product level rises or drops by a predetermined distance. FIG. 7 also shows the nominal level of the product 32 when the device is attached to the wall, and the level to which the product must rise 162 or fall 164 to cause the device to pull away from the wall and reattach itself at a higher or lower level. In general, this rise or drop is between 0.25 and 0.5 in.

The cylindrical float is made of a very lightweight foam whose specific gravity is small compared to that of the product in the tank. Gasoline, diesel, and kerosene products have a specific gravity between 0.7 and 0.9, whereas water has a specific gravity of 1.0. The specific gravity of the foam is approximately 0.1, but the specific gravity can be more or less depending on the weight of the other components of the reference device 28. The upper fiducial 46 is designed to remain in a fixed position relative to the transducer over the duration of a leak detection test. If the reference device 28 moves during a test, the accompanying 0.25 to 0.5 in. drop or rise in product level will be large enough to be easily distinguished from naturally occurring level changes; if this happens, the test will be nullified and will have to be restarted. The specific gravity and volume of the cylindrical float is especially designed in relation to the other components of the reference device 28 so that the fiducial 46 can maintain one of two positions with respect to the surface 32 of the product. It is designed to keep the upper fiducial 46 of the reference device 28 as close to the surface as possible and still permit measurements of changes in product height that are independent from those of upper fiducial 46. It is designed to rise or fall in steps of 0.25 to 0.5 in. after the level of the product has changed by a corresponding amount. Although such changes are generally considered small in an absolute sense, they are large in comparison to the changes that can be expected to occur during a leak detection test, when non-leak-related changes are present in addition to leak-related ones. In the preferred embodiment, the minimum distance between the product surface 32 and the upper fiducial 46 is approximately 1.75 in., which is controlled by the width of the acoustic pulse and the method of acquiring the data. During a test, the reference device 28 and the upper fiducial 46 (which is physically located about 2 in. or less below the surface) are fixed with respect to the transducer. The fiducials 46 and 48 on the bottom of the reference device are used to measure changes in sound speed and temperature in the layer of product between the transducer and the liquid surface. The product level can rise or fall only a certain amount (i.e., a defined minimum and maximum distance in terms of height) before the reference device detaches itself from the wall, moves up or down one increment, and reattaches itself at a new level. The incremental distance that the reference device 28 is designed to move is such that upper fiducial 46 will always be close enough to the surface so that any error in estimating the average changes in sound speed will be small enough not to impact the leak detection performance of the ATG.

The wheel 38 rotates about an axle 44 extending through the wheel 38 and held in place by the support 42. The wheel 38 has a diameter somewhat smaller than the internal diameter of the tube 18 and is about $\frac{1}{8}$ to $\frac{1}{4}$ in. thick at its circumference. The circumference is not smooth but is comprised of a number of segments, or facets, of equal length. These facets, made of permanent magnetic material, are laid end to end around the periphery of the wheel. As shown in FIG. 7, if the internal diameter of the tube is $1\frac{1}{2}$ in. and the circumferential diameter of the wheel is $1\frac{1}{4}$ in., the wheel could be configured so as to have 12 facets each approximately 0.4 in. in length. Since there is a direct relationship between the number of facets, the strength of the magnetized segments of material, the strength of the guide magnet 40, if one is used, (see alternative embodiments of the reference device below) and the amount of change in product level, the reference device 28 can be designed to move in certain incremental amounts in accordance with the incremental changes in the level of the product.

When the product level drops 164 or rises 162, the gravitational or buoyant forces exerted on the reference device 28 exhibit a corresponding change, thereby creating a moment centered about the point of contact between the tube 18 and the attached facet 74 in the direction of the product-level change. Hence, a sufficient decrease in product level would create a correspondingly sufficient moment force at this point of attachment; the moment force would overcome the strength of the magnetized segment, causing the wheel 38 to rotate and travel down the side of the tube 18. The same physical principle applies in the inverse to increases in the product level.

The optimum minimum and maximum distances that the reference will remain fixed to the wall of the vertical mount before dropping or rising can be determined from the analysis of a free-body force and moment diagram. Overall, these distances depend on the buoyancy exerted by the liquid on the reference device (upward force), the weight of the reference device (downward force), and the frictional forces produced by the magnetized facets. The reference device will fall (or rise) when the net vertical forces are sufficient to create a moment about the center axle of the pinwheel 44 that overcomes the facet's magnetic attraction to the wall and causes the wheel to rotate about the lower (or upper) edge 70, 72 of the magnetic facet attached to the tube. The overall center of gravity of the reference device is designed to be as low as possible to ensure that the device will rise and fall along a line that is perpendicular to the surface; this guarantees that the acoustic return from the fiducials 46 and 48 will be strong.

Figure 8:
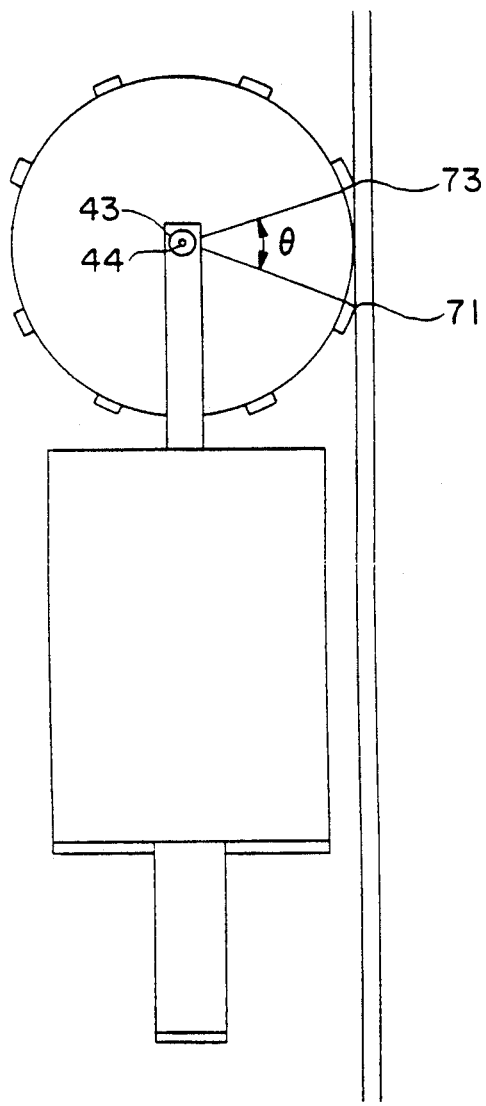
FIG. 8 is a cross-sectional view of a first alternative embodiment of the "pinwheel" subsystem on the quasi-static reference device shown in FIG. 7.
Figure 9:
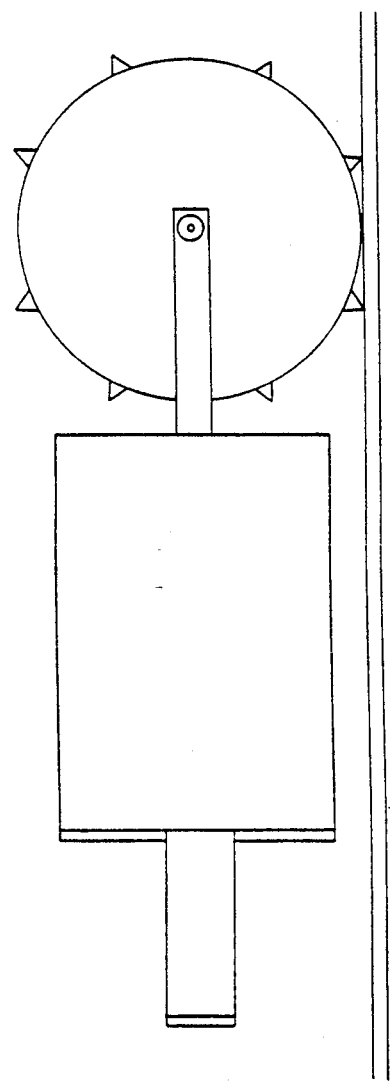
FIG. 9 is a cross-sectional view of a second alternative embodiment of the pinwheel subsystem on the quasi-static reference device shown in FIG. 7.

Two alternative embodiments of the pinwheel are shown in FIGS. 8 and 9. In both embodiments, discrete magnets are used at each fulcrum point, but the number of fulcrum points is the same as the number of facets in the preferred embodiment. The three embodiments in FIGS. 7, 8, and 9 are thus functionally similar. An analysis of the static forces and moments on these alternative embodiments of the pinwheel shows the important tradeoffs in the design of the reference device 28. The number of magnetic facets can be calculated from a free-body analysis and depends on the strength of the magnetic material, the coefficient of friction between the magnet and (1) the wall, and (2) the angle between axle and the lower edge of the magnet facet attached to the wall. This analysis assumes that the pin and axle are frictionless. The results of the analysis show that the device will function properly in both the upward and downward direction if the following relationships are satisfied:

$$\left[\left(\left(2\tan\left(\frac{\theta}{2}\right)\right)/\alpha\right)-1\right][F_{m2}/F_{m1}] < 1 \quad (1)$$

$$\left[\left(\left(2\tan\left(\frac{\theta}{2}\right)\right)/\beta\right)-1\right][F_{m1}/F_{m2}] < 1 \quad (2)$$

where
$\theta$ = the arc angle between the upper 73 and lower 71 magnetic contact points
$F_{m1}$ = the magnetic force at the lower contact point 71
$F_{m2}$ = the magnetic force at the upper contact point 73
$\alpha$ = the coefficient of friction between the magnet and the wall at a lower contact point 71
$\beta$ = the coefficient of friction between the magnet and the wall at a upper contact point 73

If magnets of the same strength, size, and material are used all around the pinwheel, then $\alpha = \beta$ and $F_{m1} = F_{m2}$ and the reference device will function in both directions if the following relationship is satisfied:

$$(\alpha = \beta) > 2\tan\left(\frac{\theta}{2}\right) \quad (3)$$

A pinwheel with N magnets satisfies the condition imposed by the friction conditions in Eq. (3). The number N of equally spaced magnets around the circumference is $\theta = 2\pi/N$. For a large number of magnets $$2\tan\left(\frac{\theta}{2}\right) = 2\pi/N \quad (4)$$

If $N = 12$, for example, $(\alpha = \beta)$ must be less than or equal to 0.25 for $F_{m1} = F_{m2}$.

The analysis shows that a minimum number of facets is required for the reference device to move in incremental steps rather than slide continuously in tandem with the surface changes. If the number of facets is too small, the frictional force at the fulcrum point 70 in FIG. 7 during a rotation of the pinwheel may be too small to prevent the system from sliding without completing a one-facet rotation. If the number of facets is too large, the dynamic force produced when the reference device is dropping (and not accounted for in the static analysis presented below) may result in a rotation of the pinwheel greater than one facet. This would not interfere with the primary function of the reference device if, when the device came to its new position and reattached itself to the wall of the tube, it did so squarely on the next facet and not in an intermediate position centered on the edge between two facets. If the latter occurred, the reference device would not remain in a fixed position on the wall but would rotate into a position of equilibrium with the changing product level. With common magnetic materials and a magnetized stainless steel tube that is 1.5 in. in diameter, a pinwheel with 10 to 14 facets functions is preferred.

As shown in FIG. 7, the reference device will drop or rise when the liquid surface is at a fixed point 162 or 164 on the cylindrical float 36. The size of the increment is then equal to the length of a facet.

The diameter of the wheel is based on the location of the axle 44 and the strength, density, and frictional properties of the magnetic material used for the facets. The axle 44, or center of rotation of the pinwheel, lies approximately on a vertical line through the center of gravity and center of buoyancy of the reference device so that the device will rise and fall vertically rather than bob on an angle. In this way, the faces of the fiducials 46 and 48 will remain approximately perpendicular to the acoustic beam being transmitted up the tube, thus ensuring strong and detectable acoustic reflections.

Figure 10:
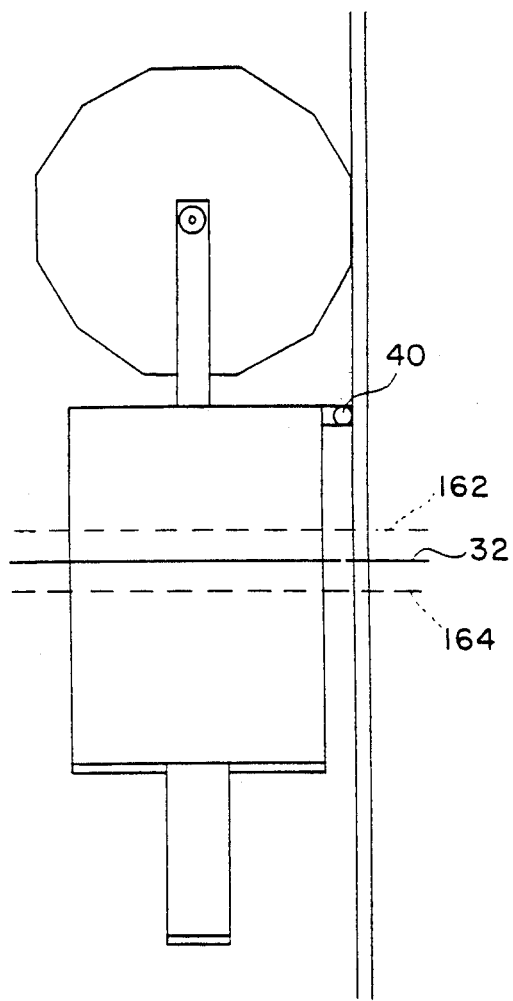
FIG. 10 illustrates a first alternative embodiment of the quasi-static reference device shown in FIG. 7, comprised of a guide magnet located on the float.
Figure 11:
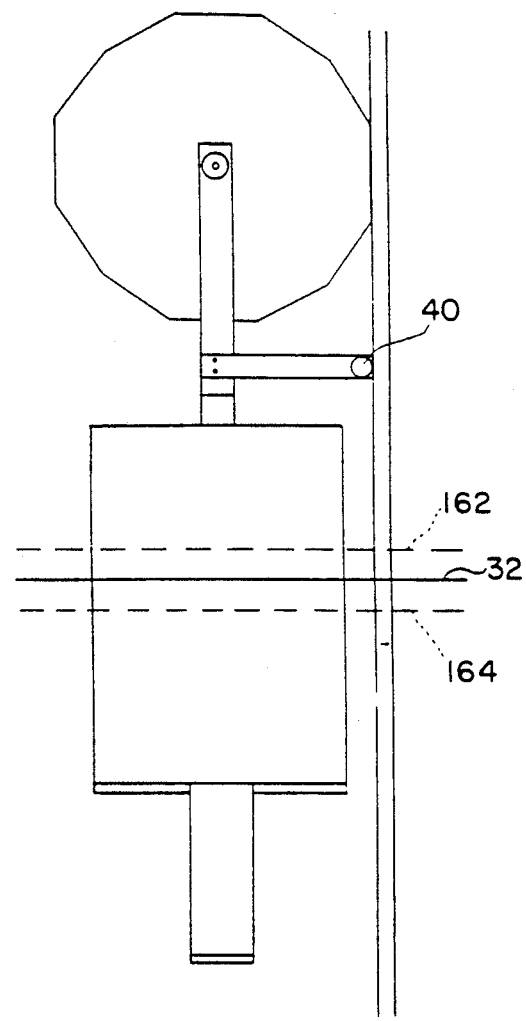
FIG. 11 illustrates a second alternative embodiment of the quasi-static reference device shown in FIG. 7, comprised of a guide magnet located above the surface of the liquid and attached by means of a horizontal member to the support that connects the pinwheel to the float.

Two alternative embodiments of the quasi-static reference device shown in FIG. 7 are shown in FIGS. 10 and 11. The reference device in FIGS. 10 and 11 is identical to the one in FIG. 7, except that guide magnet 40 has been raised above the product level 162. The purpose of the guide magnet 40 is to help keep the reference device vertically aligned.

The actual location of this guide magnet 40 on the reference device can vary provided that it is not positioned where it will produce a detectable acoustic echo. The position of the guide magnet 40 shown in FIG. 7 is above the fiducial 46 but close enough to it that the system cannot complete the processing of the echo from the fiducial 46 in time to also detect and process the echo from the guide magnet; in other words, the system has enough time to detect and process the echo from the fiducial 46 but not enough time to let the echo from the guide magnet 40 interfere. The guide magnetic 40 can also be positioned along the side of the cylindrical float at the very top, so that it is never submerged. When the guide magnet is positioned above the highest level that the liquid can rise, no echo is produced by the guide-magnet. FIGS. 10 and 11 illustrate other locations for the guide magnet. In FIGS. 10 and 11, the guide magnet 40 is fixed to the float and the pinwheel support, respectively, and above the highest level that the product may rise; again, this means that it will not be submerged and there is no possibility of an unwanted acoustic echo.

Figure 13:
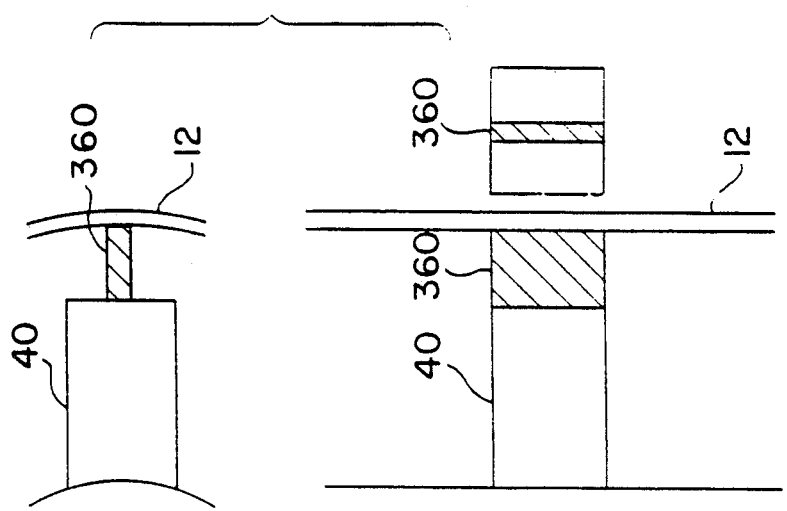
FIG. 13 shows front, side and top views of a first alternative embodiment of the guide magnet on the quasi-static reference device shown in FIG. 7; this embodiment is a thin magnet with a very low coefficient of friction that slides up and down on the wall of the vertical mount.
Figure 12:
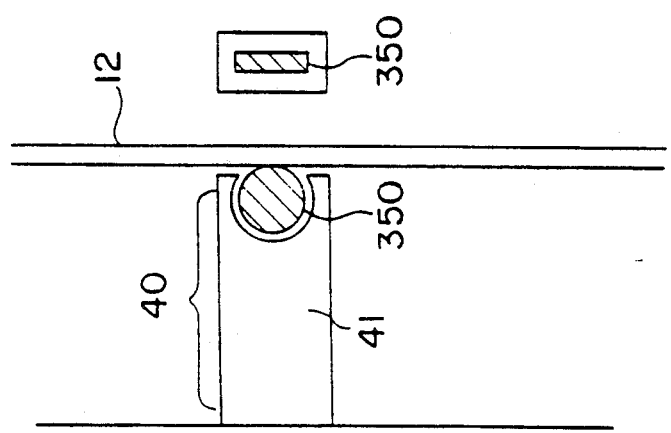
FIG. 12 shows front and side views of the preferred embodiment of the guide magnet on the quasi-static reference device shown in FIG. 7; this embodiment is a cylindrical magnet that rolls up and down on the wall of the vertical mount.
Figure 14:
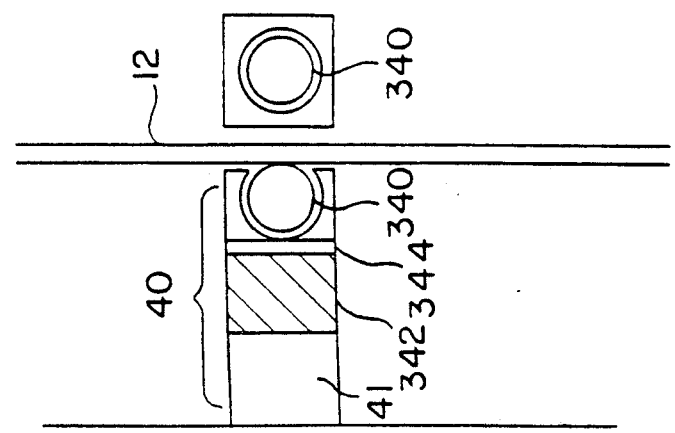
FIG. 14 shows front and side views of a second alternative embodiment of the guide magnet on the quasi-static reference device shown in FIG. 7; this embodiment is a magnetized ferromagnetic ball bearing that rolls up and down on the wall of the vertical mount.

The guide magnet 40 in FIGS. 7, 10 or 11 is shown in detail in FIG. 12. It consists of a magnetized solid cylinder 350 that is allowed to move freely in a holder 41. This guide magnet is used primarily to help maintain vertical alignment when the reference device changes position. FIG. 12 shows side and front views. The guide magnet has a relatively thin horizontal dimension, so that it will adhere to the wall of the probe, which has a relatively small radius (a radius of 0.5 in. or larger). A thin, cylindrical magnet with the smallest coefficient of friction possible is the preferred embodiment because it will allow the reference device to roll vertically along the wall and slide horizontally to maintain vertical alignment with the surface. Because the cylindrical magnet rolls on the tube wall, it can only transmit forces perpendicular, or normal, to the wall. Therefore, it produces no substantial vertical frictional forces that would affect the rotation of the pinwheel about the corners of the facets. An alternative embodiment is shown in side, front, and top views in FIG. 13, where the cylindrical magnet is replaced by a thin, small, rectangular guide magnet 360. The rectangular embodiment will produce both frictional forces and forces normal to the tube wall, and its strength has to be carefully calculated to ensure proper functioning of the pinwheel. Another embodiment is shown in side and front views in FIG. 14, where a small, ferromagnetic ball bearing 340 replaces the cylindrical magnet 350 of FIG. 12. The ferromagnetic ball bearing is magnetized by a magnet 342 placed in a nonmagnetic holder 41. The ball bearing is thus attracted to the metal wall of the tube and can roll either horizontally or vertically without transmitting any frictional forces. Regardless of the type, the guide magnet should be strong enough that the reference device does not separate from the wall of the tube during vertical travel. If this happens, the reference system could tilt and become wedged between the walls of the tube. If three or more equally spaced roller magnets are used along the circumference of the cylindrical float, vertical alignment can also be maintained and the possibility of the float getting stuck can be eliminated.

An alternative embodiment of the quasi-static reference device shown in FIG. 10 can be seen in FIG. 15, where the guide magnet 40 of FIG. 10 has been replaced by a second magnetized wheel 60. The second wheel 60 has a smooth magnetized circumference so that it can roll up and down the sides of the vertical mount 18 about its axle 62. The distance between the axle 62 and the sleeve 61 should be smaller than the smallest level change to be measured, so that the float 36 can not bob up and down during a measurement. Although this alternative is quite similar to the embodiment illustrated in FIG. 10, it is not as desirable because its center of gravity is not as low, and therefore, it tends to not remain aligned as well.

The reference device will work the same way whether it is the pinwheel and guide that are magnetized and roll along a ferromagnetic surface, or whether, conversely, the pinwheel and guide are the ferromagnetic components and it is the surface that is magnetized (or has a magnet affixed to its length).

Some sliding of the reference device may occur when the liquid surface is immediately below or above the level at which the pinwheel will rotate. At this level, random fluctuations may initiate and then terminate a rotation at the fulcrum points 70 and 72 on the pinwheel device in FIG. 7. The amount of slippage, which might be on the order of several thousandths of an inch, will depend on the frictional force established at the fulcrum. With a high frictional force, sliding can be minimized. Therefore, materials with a high coefficient of friction are used. A leak detection test should not be initiated when the product level is too close to this critical rotation level. This can be assessed by measuring the distance between the surface and the upper fiducial. Unless this distance is greater than some specified number, a leak detection test should not be initiated. This distance will differ for different types of liquid, but should be set so that a test can be started if the liquid level is within 80% of a facet-rotation threshold.

Proper functioning of the reference device requires that the axle have low friction and that the total distance between the pin 44 and the sleeve 43 in FIG. 7 be smaller than the smallest changes that have to be measured. In the present system, the total vertical movement has to be less than 1 distance-resolution cell.

Maintaining proper vertical alignment before, during, and after the reference device rises or falls requires that its center of gravity be below its center of buoyancy. The larger the separation, the truer the alignment.

The reference device is used for measuring the height of the product surface in the tank and for testing a tank for leaks. Both the quasi-static and the fixed fiducials are required for the product-level measurements, but only the upper fiducial on the quasi-static reference is actually required for a leak detection test. The reference device must remain permanently affixed to the wall during the entire leak detection test, which may take 1 to 8 h to complete, but it is not required to remain fixed during product-level measurements, which typically take less than a minute. A two-fiducial reference device that is allowed to float vertically in the tube and is not attached to the wall can also be used for the product-level measurement.

Returning to FIG. 7, an additional fiducial 48, spaced some distance from the first fiducial 46 by a rod 50, is required in order to develop an estimate of the speed of sound near the surface of the product. Fiducial 46, $F_4$, is preferably positioned at a height, $h_4$, that is at a distance, $\Delta h_{4-s}$, 1 to 2 in. from the surface 32 of the product. Fiducial 48, $F_3$, is preferably positioned at a height, $h_3$, which is at a distance, $\Delta h_{3-4}$, 2 to 12 in. from fiducial 46. The product level itself is at the height, $h_s$, above the transducer, and the transducer is located at a height, $h_0$, above the bottom of the tank. With the acoustic echoes reflected from the surface of the product and from the various fiducials, it is possible to compensate for changes in the product level, $h_s$, that are not caused by actual increases or decreases due to a leak, for example, those due to the thermal expansion or contraction of the product over time. Unlike the prior art, the present invention does not require a series of evenly spaced fiducials in order to ensure that a fixed fiducial is located near the product surface.

FIGS. 16 through 20 are alternative embodiments of the acoustic transducer and fixed fiducial systems. FIG. 16 is identical to FIG. 7 except that the fiducials 24 and 26, which are affixed to the vertical mount, are thin bars positioned such that their long axes are perpendicular to the acoustic transducer 22. Four of many acceptable cross-sectional shapes 54, 64, 94, and 104 for the fiducials 24 and 26 are shown in FIG. 16. The triangular bar 54 has the preferred cross-section, because (1) the bottom edge of the bar is flat and perpendicular to the transducer so that the acoustic energy reflected from the fiducial is maximized, and (2) the top edges of the bar are not perpendicular to the transducer and surface and will thus minimize the acoustic energy received from fiducials and surfaces located above it.

FIG. 17 is identical to FIG. 7 except that a fiducial 25, which is permanently affixed to the vertical mount, has been added between the downward-aimed transducer 23 and the bottom of the vertical mount 27. Either a cylindrical or a bar-type fiducial (i.e., one with a triangular, half-cylindrical or square cross-section) can be used for 25. If fiducial 25 is a bar type, a triangular cross-section 56 is the preferred configuration. Fiducial 25 is used to estimate the speed of sound through the product between the downward-aimed transducer and the water/product interface. The cylindrical fiducials 24 and 26 shown in FIG. 17 can also be replaced by the bar-type fiducials 54, 64, 94, or 104 shown in FIG. 16.

The configuration of the transducer 22 and the fiducials 24, 25, and 26 shown in FIGS. 18 through 20 correspond to FIGS. 7, 16, and 17, respectively, except that the downward-aimed transducer 23 used to measure the water level in the tank is replaced by an upward-aimed transducer 33 located on the bottom of the probe's vertical mount. Since the bottom of the vertical mount 27 rests on the bottom of the tank, once the water level is greater than the thickness of the acoustic transducer, in FIGS. 18 through 20 the water/product interface will be between upward-aimed transducer 33 and a fiducial 29 or 25 located below the upward-aimed transducer 22, which is used to measure product level and do a leak detection test.

Figure 21:
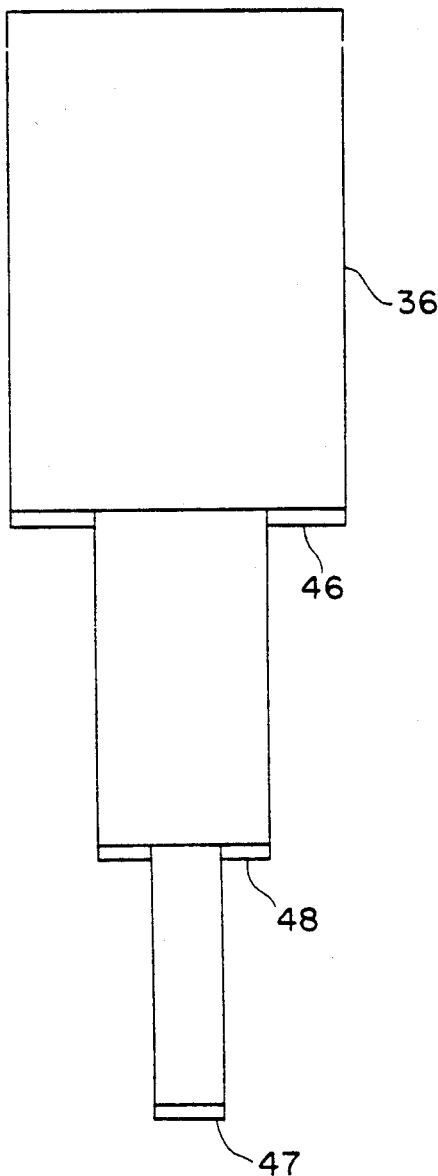
FIG. 21 illustrates a first alternative embodiment of the fiducials located on the quasi-static reference device shown in FIG. 7.
Figure 22:
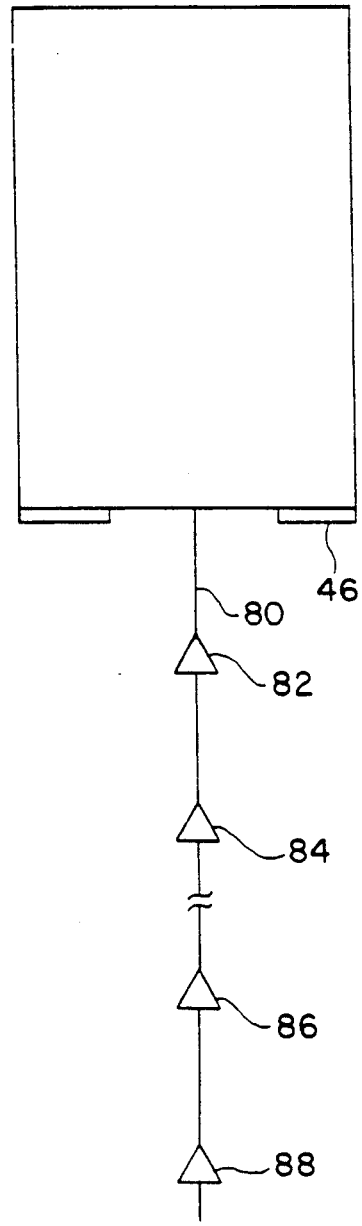
FIG. 22 illustrates a second alternative embodiment of the fiducials located on the quasi-static reference device shown in FIG. 7.

FIGS. 21 and 22 show alternative embodiments of the cylindrical float 36 and the fiducials on the quasi-static reference device 28 shown in FIG. 7. The float 36 and fiducials shown in FIG. 21 are identical to those in FIG. 7 except that an additional fiducial 47 has been added below fiducial 48. FIG. 22 is an array of many fiducials hanging on a guide cable 80 below the float 36 and the fiducial affixed to the float 46. Only four conical fiducials 82, 84, 86, and 88 are shown in FIG. 22. The bottoms of all of the conical fiducials are perpendicular to the direction of the acoustic pulse, and the cross-sectional area of each successive conical fiducial gets progressively larger from bottom to top; however, this change in cross-sectional area is not required if proper gain control is used to collect the data. There is no limit to the number of fiducials that can be attached to the guide cable 80. More accurate estimates of the height of the product surface can be achieved with the additional fiducials in the configurations shown in FIGS. 21 and 22, because the speed of sound between the highest permanently affixed fiducial 26 and the surface can be estimated more accurately with more fiducials. If the length of the array in FIG. 22 extends from the surface to the bottom of the tank and if the number of fiducials on the array is sufficient, permanently affixed fiducials like 24 and 26 are not needed to measure the height of the surface or to perform a leak detection test. If only surface height measurements are required, then it is not necessary for the float to be rigidly attached to the wall with a magnet, and the floating fiducials in FIGS. 21 and 22 can be used as shown.

a. Product-level Measurements

An estimate of the sound speed between the transducer and the liquid surface is necessary for determining the level of the product in the tank. This estimate is made from measurements made by two or more of the four fiducials 24, 26, 48, and 46 found on the probe (FIG. 7). Two different analysis algorithms are used to estimate the speed of sound between the transducer and the surface. One algorithm uses the fiducials 46 and 48 on the reference device 28 and two fixed fiducials 24 and 26, and one the other uses only the fixed fiducials 24 and 26. A third algorithm, which can be used regardless of the location of the transducer, is then used to compute the product level with either of these sound speed measurements. This algorithm gives accurate estimates of the liquid height, even if the transducer is covered with water. If the transducer is submerged in the water, and only one fiducial is used to estimate the sound speed, estimates of the height of the product surface can be highly erroneous. This is because the average speed of sound through water (e.g., 1498 m/s at 25° C.) may be very different from the average speed through the liquid in the tank (e.g., gasoline, which has a sound speed of 1147 m/s at 25° C.); thus the average speed of sound between the transducer and the fiducial may be significantly different from the average between the fiducial and the surface.

Product level is computed from estimates of the speed of sound between the upper fixed fiducial 26 and the surface. Two estimates are made, one using the two fiducials 24 and 26 fixed to the tube, and another using the two fiducials fixed to the reference device. The estimates from each pair of fiducials are averaged. More specifically, the sound-speed estimate between the surface and the upper fixed fiducial, $U_{2-s}$, is calculated in inches per second from the equation $$U_{2-s} = (U_{1-2} + U_{3-4})/2 = [((2\Delta h_{1-2})/(t_2 - t_1)) + ((2\Delta h_{3-4})/(t_4 - t_3))] \quad (5)$$

where
- $U_{1-2}$ = the speed of sound in inches/second between fiducials 24 and 26 permanently affixed to the vertical mount
- $U_{3-4}$ = the speed of sound in inches/second between fiducials 46 and 48 affixed to the quasi-static reference device
- $\Delta h_{1-2}$ = known distance in inches between fiducials 24 and 26 permanently affixed to the vertical mounts
- $t_{2-1}$ = the difference in the round-trip travel times in seconds between the transducer and fiducial 26 and the transducer and fiducial 24
- $\Delta h_{3-4}$ = known distances in inches between fiducials 46 and 48 affixed to the quasi-static reference
- $t_{3-4}$ = the difference in the round-trip travel times in seconds between the transducer and the fiducial 46 and the transducer and fiducial 48.

The height of the surface above the transducer in inches, $h_3$, is then calculated from $$h_s = h_0 + h_2 + U_{2-s}(t_{2-s})/2 \quad (6)$$

where
- $h_0$ = height of the transducer above the bottom of the tank
- $h_2$ = height of fiducial 26 in inches
- $U_{2-s}$ = average speed of sound used to estimate the speed of sound between fiducial 26 and the surface in inches/second
- $t_{2-s}$ = round-trip travel time in seconds between the fiducial 26 and the surface The accuracy of this method depends on the vertical profile of the temperature between the first fixed fiducial 24 and the surface (which may include strong temperature gradients immediately below the surface), the distance between the two fixed fiducials and the two fiducials on the reference device, the accuracy of the measurement of the distance between the pairs of references, and the accuracy of the acoustic system in measuring time. This method was evaluated under a wide range of temperature conditions with a prototype of the invention in an 8-ft-diameter, 8,000-gal underground storage tank filled to 77 in. with gasoline. Results show that this method has a precision and accuracy surpassing ⅛ in.

An estimate of the speed of sound between the upper fixed fiducial and the surface can also be made using only the two fixed fiducials 24 and 26. If the distance between the fiducials and the transducer is great, an estimate of sound speed made with two fiducials produces a more accurate estimate of height than one made with a single fiducial. This is because strong gradients in temperature tend to cause overestimation when the average sound speed is measured with a single fiducial. These strong gradients, which are found near the bottom of the tank, do not affect the estimates of sound speed made with the two fixed fiducials, because they occur only in the region below the fiducials. More specifically, the sound speed estimate between the surface and the upper fixed fiducial, $U_{2-s}$, in inches per second is calculated from $$U_{2-s} = U_{1-2} = (2\Delta h_{1-2})/(t_2 - t_1). \quad (7)$$

The height of the product is then determined from Eq. (6).

Figures 1A, 1B, 1C:
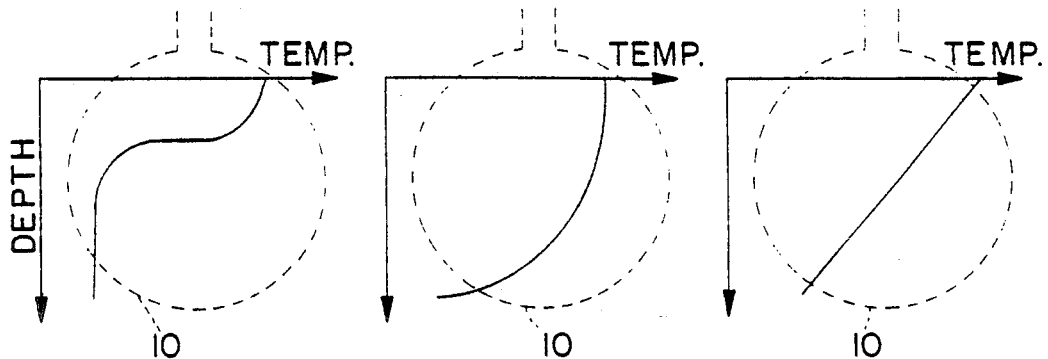
FIGS. 1a through 1g are diagrammatic representations of different temperature profiles that can be encountered during measurements of the height of the product surface and the water/product interface, or during a leak detection test.
Figures 1D, 1E, 1F:
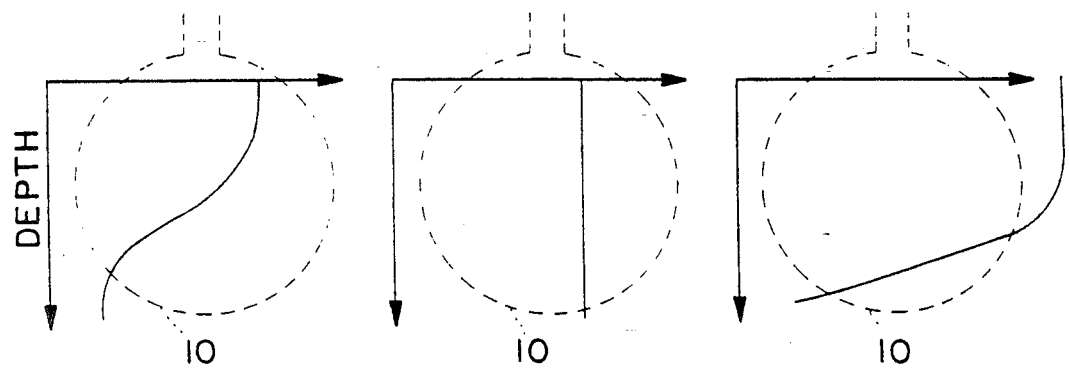
Figure 1G:
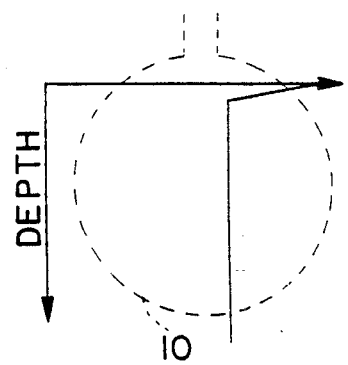
Figure 2:
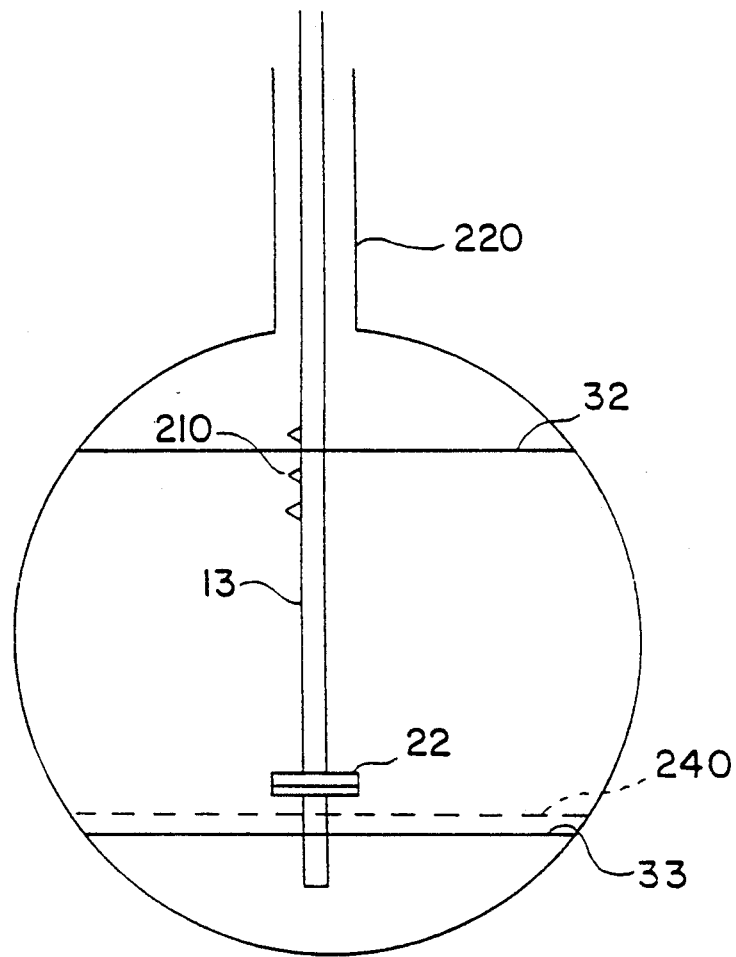
FIG. 2 is a cross-sectional view of a tank and acoustic measurement system with an upward-aimed transducer located above the highest level that the water may accumulate at the bottom of the tank before it must be removed.
Figure 3:
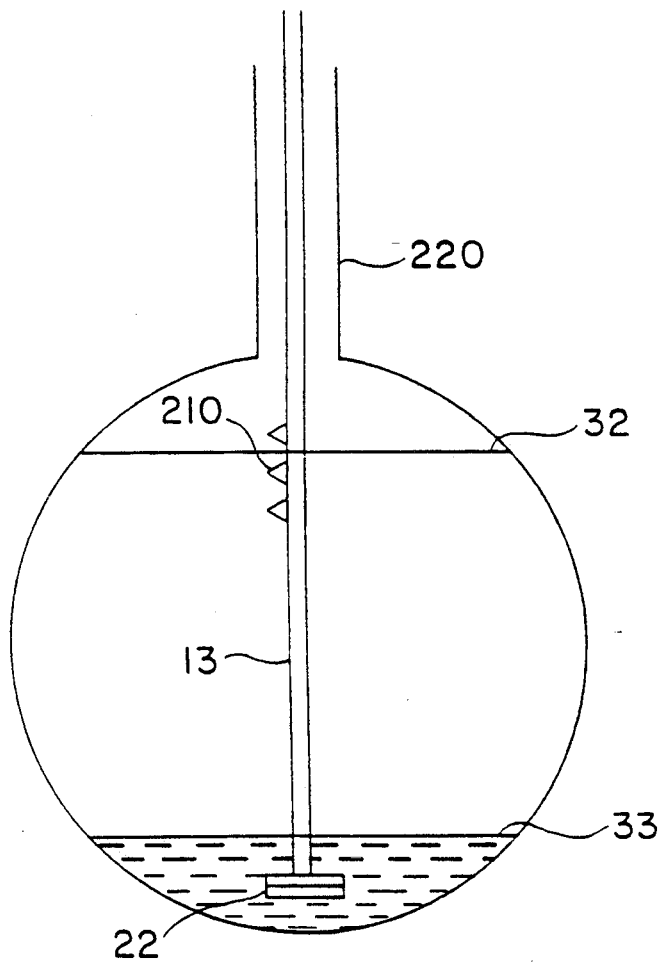
FIG. 3 is a cross-sectional view of a tank and acoustic measurement system with an upward-aimed transducer located below the nominal level at which water may accumulate at the bottom of the tank.
Figure 4:
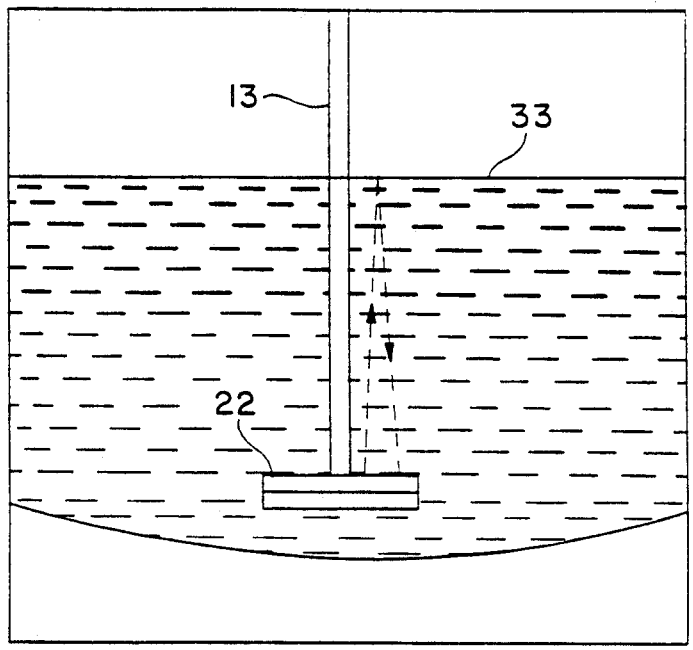
FIG. 4 illustrates one scheme by which an acoustic system can measure the level of the water at the bottom of a tank: an upward-aimed transducer, located below the nominal level at which water may accumulate, receives the direct reflection of an acoustic pulse from the water-product interface.
Figure 5A:
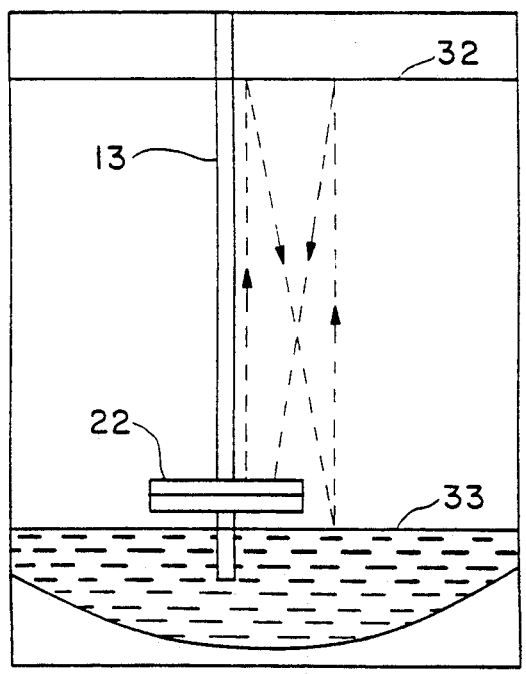
FIGS. 5(a) and 5(b) illustrate other schemes by which an acoustic system can measure the level of the water at the bottom of the tank using an upward-aimed transducer that is located above the nominal level at which water may accumulate.
Figure 5B:
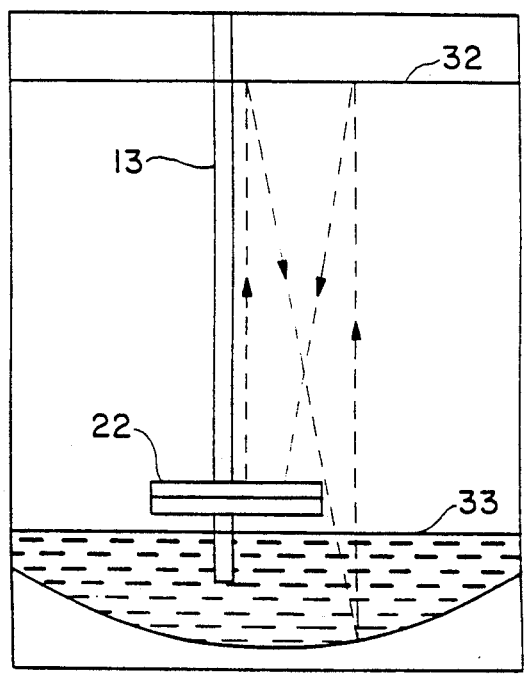

FIG. 1 illustrates a variety of temperature profiles that may be encountered in the product in an underground storage tank. FIG. 23(a) is a sound-speed profile measured in a gasoline tank filled to 78.7 in. The sound-speed profile is estimated directly from the temperature profile in FIG. 23(b) by means of the following empirically derived relationship for gasoline:

$$U = -4.45T + 1258.45 \quad (8)$$

where
- $U$ = sound speed in meters/second
- $T$ = temperature in degrees Centigrade The sound speed at the location of the two fixed fiducials 24 and 26 and the two quasi-static fiducials 46 and 48 is shown in FIG. 23(a). The actual sound speed between the second fixed fiducial 26 and the surface (as well as the sound speeds between any two points on the profile) was estimated by integration of the sound-speed profile. The true average sound speed (true $U_{2-s}$) between the second fixed fiducial and the surface is shown as the solid box in FIG. 23(a). The open box is the sound speed between fiducials 24 and 26 that is calculated using Eq. (7) and the open circle is the sound speed estimated from fiducials 24, 26, 46 and 48 with Eq. (5). The true sound speed between the transducer and the surface is denoted by the plus sign. In this temperature profile, the error in measuring the surface height from Eqs. (6) and (7) is 0.03 in.

b. Water-level Measurements

As shown in FIG. 7, the level of the water 33 in the tank is measured by the downward-pointed transducer 23, which emits an acoustic pulse that is reflected from the water/product interface. The speed of sound through the product between the transducer and the water/product interface, which is required to convert the round-trip travel time to distance, is measured by the upward-pointing transducer 22, which emits an acoustic pulse that is reflected from the lower fiducial 24 (which is a known distance from transducer 22). The speed of sound estimated with this lower fiducial is sufficient to meet the ⅛-in. accuracy requirement providing that the fiducial 24 is located within approximately 6 to 12 in. of the upward-pointing transducer. Alternatively, as shown in FIG. 17, a fixed fiducial 25 can be located between the downward-pointing transducer and the maximum water level. In both configurations, the water can be measured at any level from the bottom of the tank up to approximately 4 in. The level of the water above the bottom of the tank, $h_w$, in inches is calculated from the following algorithm:

$$h_w = h_h - [t_{w-p} U_1 / 2] \quad (9)$$

where
- $h_b$ = the distance between the bottom of the tank and acoustic transducer 23 in inches
- $t_{w-p}$ = the round-trip travel time between the transducer 23 and the water/product interface in seconds
- $U_1$ = the speed of sound through the product between the transducer and the water/product interface (1) estimated from a temperature measurement of the product, (2) measured between the transducer 22 and the nearest fiducial 24 affixed to the vertical mount, or (3) between the transducer 23 and the nearest fiducial 25 affixed to the vertical mount Alternatively, the lower transducer can be mounted below the water/product interface and pointed upward (33 in FIGS. 18 through 20). With this approach, the water level cannot be measured when it is below the transducer, i.e., near or at the bottom of the tank. The minimum depth that can be measured is controlled by the thickness of the transducer and the interference of the acoustic reflection from the water/product interface with the transmitted pulse.

An alternative algorithm can be used to measure water level without the acoustic reflection from the water/product interface. This approach can be used when the water/product interface cannot be detected, or as a stand-alone measurement. It requires that the acoustic reflection from the bottom of the probe 27, which is located at a known distance from the transducer, be measured. The approach can be implemented with the downward-pointed transducer shown in FIGS. 7, 16 and 17, or with the upward-pointed transducer shown in FIGS. 18 through 20, which is submerged in water, by means of the following algorithm, which is used to calculate the height of the water above the bottom of the probe, $h_{w-pb}$:

$$h_{w-pb} = [h_{pb} - (U_1 t_{pb}/2)] / [1 - (U_1 / U_w)] \quad (10)$$

where
- $h_{pb}$ = the distance between the bottom of the tank and acoustic transducer 23 in inches
- $t_{pb}$ = the round-trip travel time between the transducer and the reference bottom of the probe in seconds
- $U_w$ = the speed of sound through water.

The height of the water above the bottom of the tank can be calculated by adding the distance between the bottom of the probe, which reflects the acoustic pulses, and the bottom of the tank to $h_{w-pb}$ calculated by Eq. (10).

The accuracy of this indirect water-level measurement concept depends primarily on the accuracy of the estimate of the sound speed in both the product and the water. The estimate of the speed of sound through the product is made from the fixed fiducial 24 in FIGS. 7, 16, 18 and 19 or fiducial 25 in FIGS. 17 and 20, and the estimate of the speed of sound through water is made from the well-known relationship between sound speed and temperature, available from published sources. This relationship is used in combination with an estimate of the temperature made by a sensor 19 in FIG. 7. The speed of sound through water, $U_w$, in m/s is estimated from $$U_w = 1498 + 2.4 T \quad (11)$$

The temperature sensor 19 located near the bottom of the probe assembly is used to estimate T in Eq. (11).

c. Leak Detection Test

The product in a tank (as well as the tank itself) is continually expanding or contracting in response to temperature. This causes changes in the product level that are not due to leaks. To find small leaks, therefore, the product-level changes due to thermal expansion and contraction must be compensated for. During a leak detection test, the upper fiducial 46 on the reference device 28 and either the lower or upper fixed fiducial (24 or 26) usually located in the bottom third of the tank are used to calculate a temperature-compensated level change (volume change) with sufficient accuracy to meet or exceed the EPA standards for an ATG or tank tightness test. An array of fiducials can be used to calculate an average product temperature that is weighted according to the cross-sectional area of the tank (i.e., a volumetrically weighted average). Although one can meet the EPA regulation with only one fiducial, additional accuracy can be obtained by using more.

The largest errors encountered by acoustic measurement systems such as the present invention are due to improper weighting of the large temperature changes that occur near the bottom and top of the tank, and erroneous estimates of the sound speed between the surface and the fiducial closest to the surface. The present invention addresses both problems. It is not necessary to know the height of the reference device above the transducer in order to perform a leak detection test. However, the position of the fiducial on this device must remain at a fixed height as close to the surface as possible during the test. The primary function of the reference device in a leak detection test is to provide this fixed location for the fiducial.

The round-trip travel time is calculated from the acoustic echoes reflected from the surface, one of the fixed fiducials (e.g., 26), and a fiducial on the reference device (the one closest to the surface 46). The temperature-compensated level changes measured in inches, $\delta h_s$, are calculated from $$\delta h_s = 39.37 \left(\frac{U}{2}\right)\left[\delta t_s - \delta t_r - \frac{V}{Ah} C_e t_s \Delta T\right]. \quad (12)$$

where
- $U$ = speed of sound in meters/second between the transducer and the surface which can be estimated (1) between fiducials 46 and 48, (2) between fiducials 24 and 26, (3) between the transducer and fiducial 24, or (4) between the transducer and fiducial 26, or with an average or weighted average of any combination of these,
- $\delta t_s$ = change in the round-trip travel time over the measurement period in seconds between the transducer and the surface
- $\delta t_r$ = change in the round-trip travel time over the measurement period in seconds between the transducer and a fiducial such as 46, which is rigidly fixed to the vertical mount
- $V$ = volume of the product in the tank in inches$^3$ at the height of the surface of the product in the tank
- $h$ = height of the liquid surface in the tank above the acoustic transducer in inches
- $A$ = cross-sectional area of the surface in inches$^2$ of the product in the tank at the height of the surface of the product above the bottom of the tank
- $C_e$ = coefficient of thermal expansion of the liquid in the tank
- $t_s$ = round-trip travel time between the transducer and the surface in seconds
- $\Delta T$ = change in the average weighted temperature between the transducer and the fiducial 46 that is located closest to the surface and affixed to the vertical mount during the measurement and $$\Delta T = -\left(W_1 U_{1-2}\left(\frac{\delta t_{(1-2)}}{t_{(1-2)}}\right) + W_2 U_2 \left(\frac{\delta t_{4-(1-2)}}{t_{4-(1-2)}}\right)\right)\left(\frac{dU}{dT}\right)^{-1}. \quad (13)$$

where
- $W_1$ = volume of the product in the tank below fiducial 24 or fiducial 26 divided by the total volume of the product in the tank
- $W_2$ = the volume of the product between fiducial 24 or fiducial 26 and the surface divided by the total volume of the product in the tank = $1 - W_1$
- $\delta t_{1-2}$ = change in the round-trip travel time between the transducer and either fiducial 24 or 26 in seconds
- $\delta t_{4-1-2}$ = change in the round-trip travel time between fiducial 46 on the quasi-static reference device and either fiducial 24 or fiducial 26
- $t_{(1-2)}$ = round-trip travel time between the transducer and either fiducial 24 or 26
- $U_{(1-2)}$ = sound speed between the transducer and either fiducial 24 or 26
- $U_2$ = sound speed between the transducer and fiducial 26

$$\frac{dU}{dT} =$$

rate of change of sound speed of the product as a function of the temperature of the product An estimate of the average temperature change is made from $$\Delta T = -\frac{\delta t_r}{t_r}\left(\frac{1 dU}{U dT}\right)^{-1}. \quad (14)$$

where $t_r$ is the round trip travel time between the transducer and fiducial 46 on the quasi-static reference device.

The first term in the square brackets in Eq. (12), $\delta t_s$, is a measurement of the product-level changes. The second term, $\delta t_r$, is used to correct the level changes for errors in sound speed, and the third term, involving $\Delta T$, is the one that compensates for the thermal expansion and contraction of the product produced by temperature changes in the product. If a fixed fiducial is not located within 2 to 3 in. of the surface, the sound-speed correction for level changes in the second term can be significantly in error relative to the leak detection performance standards specified by the EPA. Due to the heat transfer between the liquid and the vapor found immediately above the surface, temperature and sound speed can change significantly in the upper 12 in. of the product. The reference device 28 minimizes this error because it always positions a fiducial within 2 to 3 in. (or less) of the surface. Temperature compensation is accomplished in the third term. In the present embodiment, the temperature is weighted only by two fiducials. In large tanks, or others in which more accurate compensation is required, additional weighting may be necessary. This is accomplished by means of one or more additional fixed fiducials or the fiducials in FIGS. 21 or 22, which are separated by a known distance. With the present invention, the bottom two fixed fiducials 24 and 26 can be used in conjunction with the fiducial 46 for temperature compensation as described by $$\Delta T = -\left(W_1 U_1 \frac{\delta t_1}{t_1} + W_{1-2} U_{1-2} \frac{\delta T_{1-2}}{t_{1-2}} + W_{2-s} U_{2-s} \frac{\delta t_4}{t_4}\right) \quad (15)$$

where
- $U_{1-2}$ = the sound speed estimated between fiducials 24 and 26
- $U_{2-s}$ = the sound speed estimated between fiducial 26 and the surface using Eq. (5)
- $W_{1-2}$ and $W_{2-s}$ = the volume of product between fiducial 24 and 26 and fiducial 26 and the surface, respectively, divided by total volume of product in the tank.

An alternative yet similar equation that can be used to estimate the temperature-compensated level changes is $$\delta h_s = \frac{U}{2}\left(\delta t_s - C_1 \delta t_r - \frac{V}{Ah} C_e t_s \Delta T\right). \quad (16)$$

The only difference between Eqs. (12) and (16) is the term that is used to correct the level changes for sound speed. Once the speed of sound through the layer of product between the transducer and the upper fiducial 46 on the reference device has been estimated, the quantity ($C_1$) in Eq. (16) is a constant used to extrapolate that estimate to the layer of product between this fiducial 46 and the surface. Another method of estimating the $\delta h_s$ is to use the sound speed measured with the two fiducials on the reference device to estimate the sound speed between fiducial 48 and the surface, as given by $$\delta h_s = \frac{U}{2}\left(\delta t_s - \frac{V}{Ah}C_e t_s \Delta T\right) - \frac{\delta t_r}{2t_s}(t_r U + (t_s - t_r)U_{3-4}) \quad (17)$$

where $U_{3-4}$ = speed of sound between fiducials 46 and 48.

d. Alternative Embodiments of the Quasi-Static Reference Device

Figure 26:
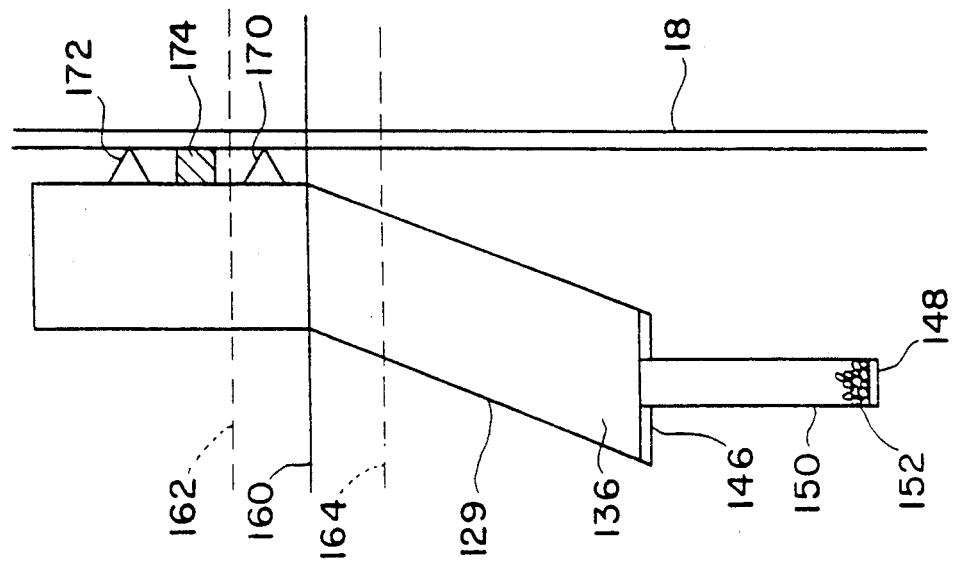
FIG. 26 illustrates a sixth alternative embodiment of the quasi-static reference device shown in FIG. 7 that replaces the magnetic pinwheel of FIG. 7 with a magnet-fulcrum subsystem that moves the reference device up and down the wall of the vertical mount.
Figure 25:
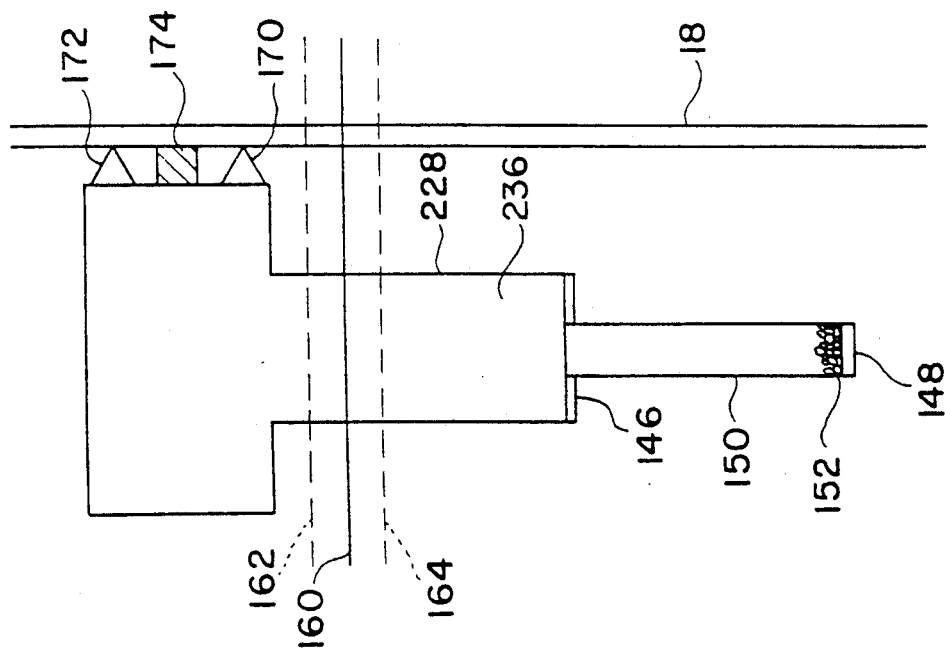
FIG. 25 illustrates a fifth alternative embodiment of the quasi-static reference device shown in FIG. 7 that replaces the magnetic pinwheel of FIG. 7 with a magnet-fulcrum subsystem that moves the reference device up and down the wall of the vertical mount.

FIGS. 24 through 26 illustrate three alternative embodiments of the quasi-static reference device that do not rely on a magnetized wheel but nevertheless operate on the same basic principles. All three are variations on the "woodpecker" embodiment of the reference device, as opposed to the "pinwheel" embodiment previously discussed. FIG. 24 shows a reference device 128 having a vertical cylindrical float 136, a fiducial 146 (corresponding to fiducial 46 in FIG. 7), and a fiducial 148 (corresponding to fiducial 48) spaced some distance from fiducial 146 by a rod 150. As the liquid level goes up (or down), the reference device detaches itself from the wall and reattaches itself at a higher (or lower) location. Thus, with the nominal product level 160, the following sequence occurs: the device attaches itself to the wall; there is an interval during which the product level goes down; the device then pulls away from the wall; the cycle is repeated with each incremental change in product level. The device is designed so that the difference in product level at the beginning (160) and end (162 or 164) of this interval, shown in FIG. 24, is generally between 0.25 and 0.5 in. The fiducial 148 and the rod 150 are not essential. Toward the top of the reference device 128 are two fulcrums 170 and 172 and a permanent magnet 174. The upper and lower fulcrums on this embodiment and on the ones shown in FIG. 25 and 26 are made of a material that has a high coefficient of friction with the steel tube. As with the pinwheel device, when a drop in the product level occurs that is sufficient to create a moment about the fulcrum 170 that breaks the bond between the magnet 174 and the wall 18, the woodpecker device rotates about the fulcrum 170, drops to the new level, and reattaches itself to the wall by the pull of the magnet 174. Conversely, the device moves up the tube if the liquid level rises. The woodpecker device, like the pinwheel, stays rigidly affixed to the wall during a leak detection test, because the product-level changes that occur during a test are not large enough to cause the device to move. The weight of the various components of the reference device 128 are such that the center of gravity of the reference device is below its center of buoyancy regardless of the level of the product in the tank. This keeps the reference vertically aligned with the surface and the transducer, even when the reference is released from the wall, drops or rises, and then reattaches itself to the wall. Otherwise, the reference would have a tendency to float horizontally on its side instead of vertically. The rod 150 can be a hollow plastic rod, which can be filled with a heavy material such as steel or lead shot 152, so that it will have the force and moment balances required for proper functioning of the reference device 128. Adding weight at the bottom of the rod 150 ensures that the center of gravity of the reference device is as low as possible.

An analysis of the static forces and moments acting on this reference device shows the important design features that must be specified for the reference device to drop or rise at predetermined incremental steps. It was assumed that the net vertical force obtained from the sum of the gravity and buoyancy forces always act at a fixed distance $\delta_x$ from the fulcrum, even though this distance will increase slightly when the reference device begins to rotate about the fulcrum; this distance would not change if the float and fiducials were suspended from a pin and axle as done with the pinwheel. The analysis shows that the following two conditions must be satisfied in order for the reference device to function properly with regard to downward movement:

$$\alpha > \delta_y/\delta_x \quad (18)$$

where $\alpha$ is the coefficient of friction between the fulcrum and the wall, $\delta_y$ is the vertical distance between the fulcrum and the magnet, and $\delta_x$ is the horizontal distance between (1) the contact point of the vertical wall 18, fulcrums 172 and 170, and the magnet 174, and (2) the location of the center of gravity of the net sum of the gravitational and buoyancy forces on the reference device $F_{net}$, and $$F_{net} \leq [(F_m(\delta_y/\delta_x)) = \alpha F_M] \quad (19)$$

where $F_m$ is the force holding the magnet to the wall of the tube. Eq. (18) shows that the minimum distances between (1) the fulcrum and the magnet and (2) the wall and the center of gravity of the net force on the reference device depend on the coefficient of friction between the wall and the fulcrum. Eq. (19) shows the relationship between the strength of the magnet and the net force on the reference device, so that when the device breaks away from the wall it will rotate about the fulcrum rather than slide down the side of the tube. If $\alpha = 0.1$ and $\delta_x = 0.75$ in., then $\delta_y \leq 0.075$ in., which means the fulcrum is very close to the magnet. If these conditions are satisfied, the reference device will not slide down the wall but will drop incrementally. Because of the frictional force generated between the fulcrum and the wall, the reference device will remain attached to the wall until the magnet is completely detached from the wall. Providing that Eqs. (18) and (19) are satisfied, the higher the coefficient of friction between the fulcrum 170 or 172 is, the better the performance of the reference device. The higher friction tends to keep the reference device attached to the wall, even when the balance of forces, which create the moment about the fulcrum, are just at the instant of producing the rotation. This higher friction offsets the fact that the magnet, if it has any surface area, does not detach itself from the wall all at one time. The rotation begins as soon as any part of the magnet pulls away from the wall.

The alternative embodiments of the woodpecker reference are shown in FIGS. 25 and 26 without detailed explanation, because they are substantially similar to the one shown in FIG. 24 and described above.

FIGS. 27a–f show seven embodiments of the magnet and fulcrum setup. However, any combination of fulcrum and magnet shapes can be made to operate functionally as described above. In FIG. 27a the magnet is rectangular in shape, with the vertical dimension 300 being much smaller than the horizontal dimension 314, and the fulcrums are triangular, with only the tip of the triangle 310 touching the wall. The smaller the vertical dimension of the rectangle, the easier the system is to design. This is the preferred embodiment, because the reference tends to stay better aligned vertically as it moves up and down. This embodiment works best with a vertical support 12 that presents either a flat or a nearly flat wall (one with a very large radius). In a tube of small diameter, such as the 1.5-in.-diameter tube 12 used in the preferred embodiment, only the ends of the magnet and fulcrums actually touch the wall of the tube. In another embodiment, shown in FIG. 27b, the triangular fulcrum has been replaced with a rectangular one whose vertical dimension, like that of the magnet, is smaller than its horizontal dimension. This configuration functions in the same way as the one in FIG. 27a, because once the reference device begins to rotate about the fulcrum, the rotation occurs at the edge of the rectangle. This alternative is used if better contact is needed between the wall and the fulcrum than is provided by the triangular embodiment. In FIG. 27c, the fulcrums and the magnet all have a triangular shape. In FIGS. 27d and e, the wide rectangular magnet in FIG. 27a has been replaced by one whose vertical dimension is greater than its horizontal dimension. The embodiments in FIGS. 27f and g can be used when the tube 12 has a small radius. In FIGS. 27f and g, the magnet is rectangular in shape and the fulcrums are either rectangular or triangular in shape, with the horizontal dimension of both the magnet and fulcrums that is smaller than or approximately equal to the vertical dimension. The reference device will function properly regardless of the shape of the magnets and fulcrums, so long as the constraints given by Eqs. (18) and (19) are satisfied.

Figure 30:
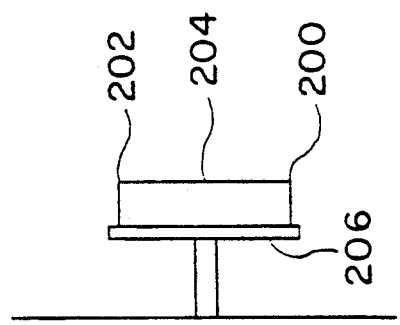
FIG. 30 illustrates an alternative embodiment of the magnet and the upper and lower fulcrums of the quasi-static reference devices shown in FIGS. 24 through 26.
Figure 29:
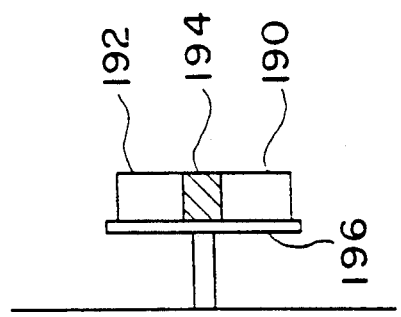
FIG. 29 illustrates an alternative embodiment of the magnet and the upper and lower fulcrums of the quasi-static reference devices shown in FIGS. 24 through 26.
Figure 28:
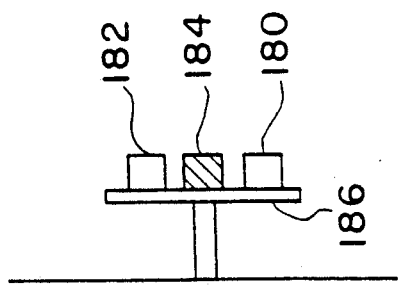
FIG. 28 illustrates an alternative embodiment of the magnet and the upper and lower fulcrums of the quasi-static reference devices shown in FIGS. 24 through 26.

FIGS. 28 through 30 show some additional alternative embodiments of the fulcrum and magnet configuration. They are similar to the embodiments shown in FIGS. 24 through 26.

The fulcrums used in all of the embodiments of the reference device can also be replaced by magnets of similar shape. This alternative is used if the vertical support 12 is not perpendicular to the surface of the product. An analysis similar to the one performed for the nonmagnetic fulcrum shows the conditions that must be satisfied for this reference device to function in the same way as the one with a nonmagnetic fulcrum. The two are very similar, as can be seen by comparing Eqs. (18) and (19) with those below. The two criteria that must be satisfied for the reference with magnetic fulcrums to function properly with regard to downward movement are:

$$\alpha \geq [\delta_y/\delta_x][1/((F_f/F_m)+1)] \quad (20)$$

where $F_f$ is the magnetic force holding the fulcrum to the wall, and $$F_{net} \leq [(F_m(\delta_y/\delta_x)) = \alpha F_m]. \quad (21)$$

If $F_f = F_m$, Eq. (21) shows that $\alpha \geq 0.5[\delta_y/\delta_x]$. If the strength of the magnet at the fulcrum 170 or 172 in FIGS. 24 through 26 is only 10% of the strength of the magnet at 174, Eq. (20) shows that $\alpha \geq 0.909 [\delta_y/\delta_x]$, or nearly the same as the relationship for a nonmagnetic fulcrum.

Figure 31A:
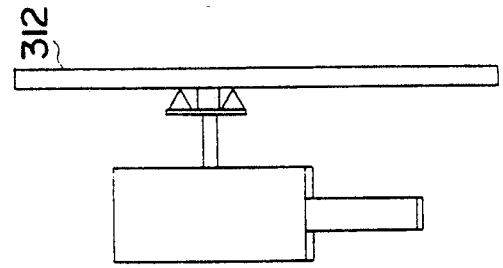
FIGS. 31a and 31b illustrate a first alternative embodiment of the vertical mount of FIG. 7, comprised of a flat plate or a large-radius cylindrical tube that permits the quasi-static reference device to move up and down with the product level in the tank in discrete steps.
Figure 31B:
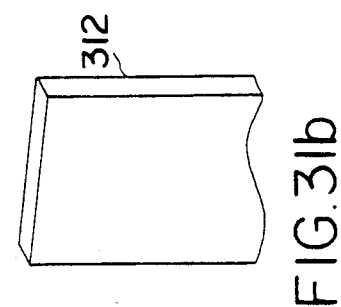
Figure 32A:
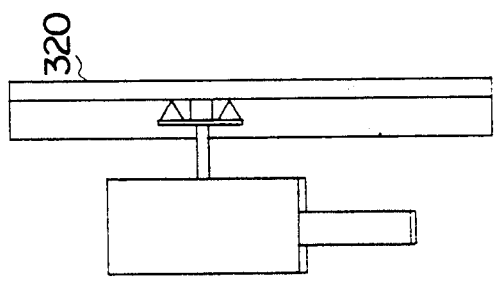
FIGS. 32a and 32b illustrate a second alternative embodiment of the vertical mount of FIG. 7, comprised of a guide channel that permits the quasi-static reference device to move up and down with the product level in the tank in discrete steps.
Figure 32B:
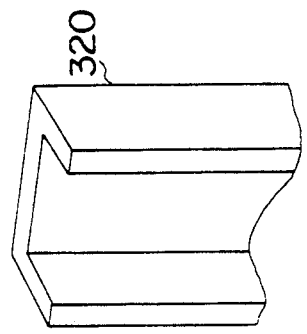
Figure 33A:
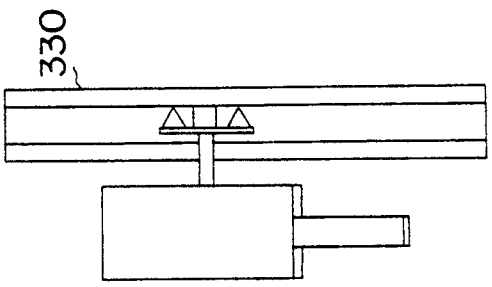
FIGS. 33a and 33b illustrate a third alternative embodiment of the vertical mount of FIG. 7 comprised of a guide channel with holders that permits the quasi-static reference device to move up and down with the product level in the tank.
Figure 33B:
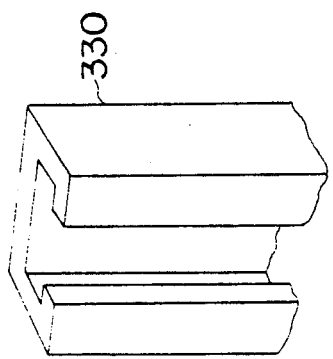

The reference device 28 does not have to be in a tube 12 such as the one described in the preferred embodiment (FIG. 7). It can be placed directly in the tank as long as there is a guide, such as a flat plate (FIGS. 31a and 31b) or channel (FIGS. 32a, 32b, 33a and 33b), along which it can move. Such a guide might even be placed within a tube 12. The guide shown in FIGS. 31a and 31b is simply a long, thin, flat rectangular staff that can be inserted into a tube. FIGS. 32a and 32b show a channel with sides 320 that are designed to keep the reference from wandering off a flat or curved surface. FIGS. 33a and 33b illustrate a channel with a holder 330 that serves as a track for the reference device.

All embodiments of the woodpecker device are attached to a wall or tube mount by a permanent magnet. The wall or tube mount must be constructed of a metal with ferromagnetic properties so that the magnet 174 that will be attracted to it.

As was the case with the pinwheel, the woodpecker device will work the same way regardless of which components are magnetized: the magnets can be replaced with ferromagnetic material if the metal tube or vertical mount is a magnet or is magnetized.

Figure 35:
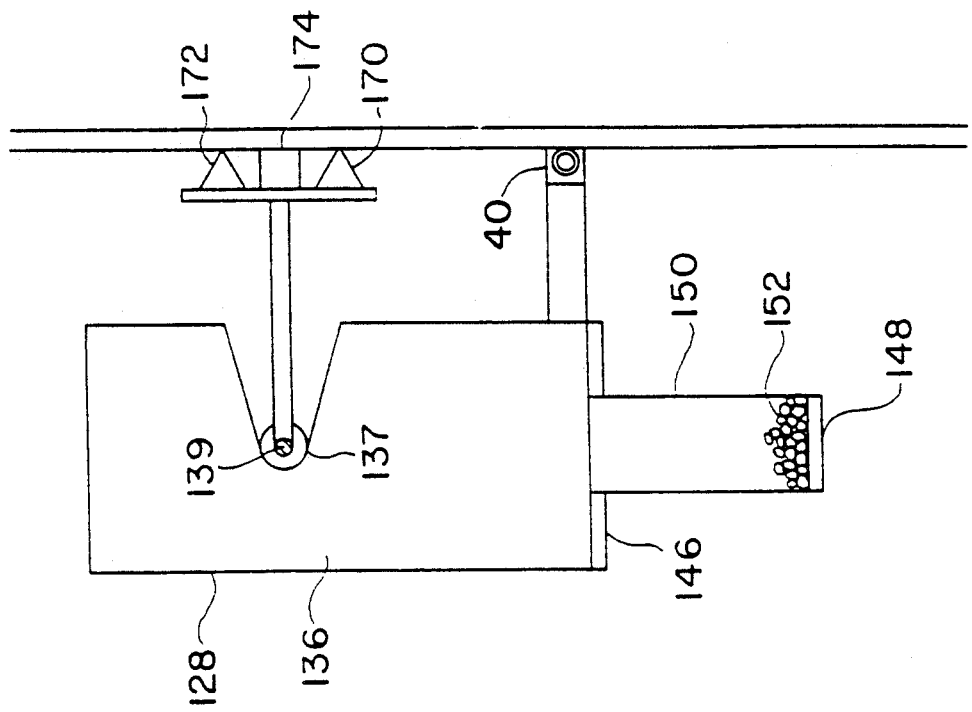
FIG. 35 illustrates an eighth alternative embodiment of the quasi-static reference device shown in FIG. 7 that replaces the magnetic pinwheel of FIG. 7 with a magnet-fulcrum subsystem attached to the float by an axle and in which a guide magnet has been added to the float.
Figure 34:
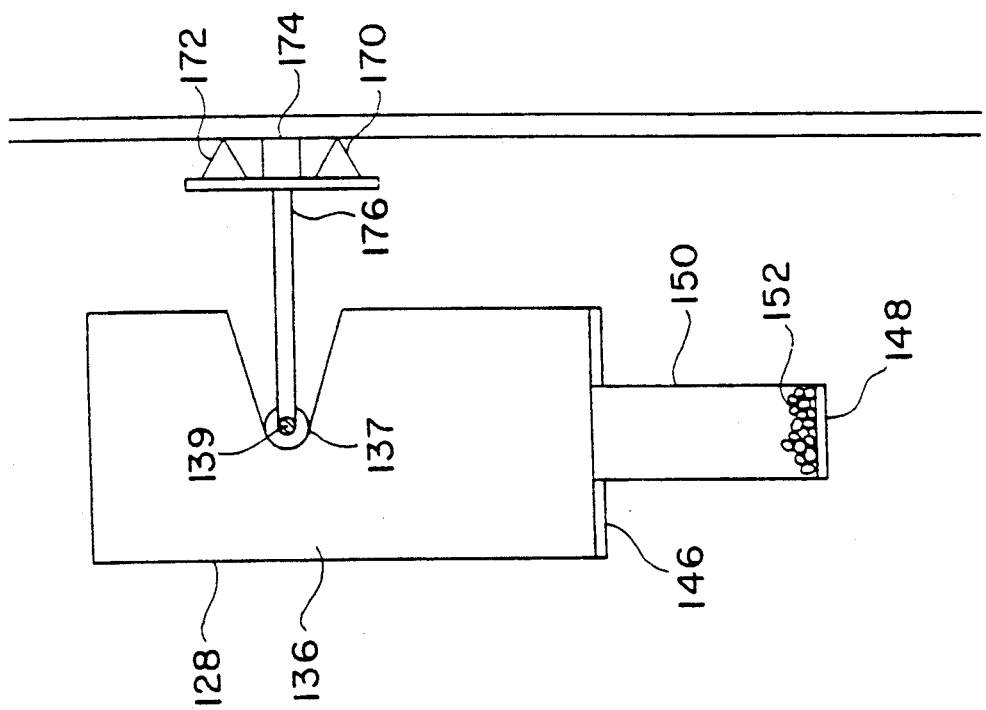
FIG. 34 illustrates a seventh alternative embodiment of the quasi-static reference device shown in FIG. 7 that replaces the magnetic pinwheel of FIG. 7 with a magnet-fulcrum subsystem attached to the float by an axle.

Two additional embodiments of the quasi-static reference device 28, using a variation of the woodpecker devices shown in FIGS. 24 through 26, are shown in FIGS. 34 and 35. These embodiments are obtained by attaching the magnet and fulcrum setup to the float and fiducial subsystem with a pin and axle by a rigid bar. The rotation of the bar is limited to a small angle, usually less than 30°, so that the magnet will reattach itself to the mount after the device has fallen or risen. The bar is physically limited from rotating beyond a certain angle. These embodiments drop and rise similarly to the woodpecker device except the float and fiducials, which are hanging from the pin and axle, remain vertical during a drop or rise of the device because the float and fiducials are free to rotate at the pin and axle. The static analysis done for the woodpecker device also describes this embodiment.

Another general embodiment of the quasi-static reference device is one in which the permanent magnet is replaced by an electromagnet that is operated either by a battery (with a timer on the reference device itself) or by a power supply (at the ATG controller or system controller) connected to the cylindrical float by wires or by remote transmitters and receivers. In the latter configuration, the reference device would be instructed by the controller to attach or detach itself from the wall whenever the surface of the product level changed by a specific amount. There could be several modes of operation. One would be to keep a current running through the electromagnet so that the reference device remained attached to the metal wall. When the level changed by a certain amount, the current would be turned off so that the reference device could rise or fall, and then, at the appropriate moment, turned on so that it would reattach itself to the wall. In the second mode of operation, the permanently magnetized wall would be the polar opposite of the permanent magnet. An electromagnet would then be used in conjunction with either the wall or the permanent magnet; the electromagnet would change the polarity of the permanent magnet so that the wall and the permanent magnet would repel one another and allow the reference device to rise or fall when so instructed by the controller. The third mode of operation is similar to the second. In this mode, the reference device would have a permanent magnet, and the tube would not have to be magnetized. A configuration would consist of a torroidal electromagnet that is placed outside the tube, floats with the product, and can be activated to produce a magnetic field with a polarity opposite to that of a power supply located at the ATG or system controller. It would be operated identically to the second mode. In the latter two modes of operation, the electromagnetic is operated only when the reference device must be detached from the wall (i.e., when the product level changes). The power requirement is less for the latter two modes than it is for the first.

If a battery is used to power the electromagnet in the first mode, a timer must be used as a means of determining when the float should attach and/or detach itself from the wall. Since the reference device has to be rigidly affixed to the wall only during a leak detection test, the timer can be used to set the precise hour to start and end a test.

Although the present invention has been described in terms of specific embodiments, it is anticipated that alterations and modifications will become apparent to those skilled in the art. It is therefore intended that the following claims be interpreted as covering all such alterations and modifications as fall within the true spirit and scope of the invention.

We claim:

1. A method for measuring the temperature-compensated change in the height of a surface of a liquid during a measurement period, comprising:
    (a) positioning acoustic signal means for emitting and receiving acoustic signals below the surface of the liquid;
    (b) positioning a quasi-static reference device having at least one fiducial such that at least one fiducial lies within a predetermined range below the surface of the liquid, wherein said reference device may move up or down with changes in the surface level of the liquid but remains fixed to a stationary support during said measurement period;
    (c) positioning at least one fiducial below the surface of the liquid to establish points separated by a known distance;
    (d) emitting acoustic signals from said acoustic signal means;
    (e) receiving and measuring the travel times for the reflections of said acoustic signals from the liquid surface and said fiducials with said acoustic signal means during said measurement period;
    (f) calculating changes in said travel times during said measurement period, and using the travel times over said known distance to estimate the speed of sound in the liquid, to correct for temperature-induced changes in said travel times, and to obtain a temperature-compensated change in travel time to said liquid surface; and
    (g) calculating the temperature-compensated change in the height of the surface of the liquid during the measurement period using the product of the estimate of the speed of sound in the liquid and said temperature-compensated change in travel time to said liquid surface.

2. The method of claim 1, wherein said quasi-static reference device positions a plurality of fiducials below the surface of the liquid, said quasi-static fiducials separated by known distances, and the estimate of the speed of sound in the liquid is obtained from said known distances and the differences in travel times to said quasi-static fiducials.

3. A method for detecting the presence of a leak in a storage tank containing a liquid, comprising the method of claim 2 and further comprising the steps of:
    (a) converting the temperature-compensated change in the height of the surface of the liquid during the measurement period to temperature-compensated volume change using the known shape of the tank and the height of the liquid in the tank; and
    (b) comparing said temperature-compensated volume change to a threshold value to determine whether said tank has a leak.

4. The method of claim 1, further comprising the step of positioning at least one fixed fiducial such that at least one fixed fiducial lies below the surface of the liquid and at a known distance from said acoustic signal means.

5. The method of claim 4, wherein the step of positioning at least one fixed fiducial positions a plurality of fixed fiducials below the surface of the liquid, said fiducials separated by known distances, and the estimate of the speed of sound in the liquid is obtained from the known distances and the differences in travel times to said fixed fiducials.

6. A method for detecting the presence of a leak in a storage tank containing a liquid, comprising the method of claim 5 and further comprising the steps of:
    (a) converting the temperature-compensated change in the height of the surface of the liquid during the measurement period to temperature-compensated volume change using the known shape of the tank and the height of the liquid in the tank; and
    (b) comparing said temperature-compensated volume change to a threshold value to determine whether said tank has a leak.

7. A method for detecting the presence of a leak in a storage tank containing a liquid, comprising the method of claim 3 and further comprising the steps of:
    (a) converting the temperature-compensated change in the height of the surface of the liquid during the measurement period to temperature-compensated volume change using the known shape of the tank and the height of the liquid in the tank; and
    (b) comparing said temperature-compensated volume change to a threshold value to determine whether said tank has a leak.

8. A method for detecting the presence of a leak in a storage tank containing a liquid, comprising the method of claim 1 and further comprising the steps of:
    (a) converting the temperature-compensated change in the height of the surface of the liquid during the measurement period to temperature-compensated volume change using the known shape of the tank and the height of the liquid in the tank; and
    (b) comparing said temperature-compensated volume change to a threshold value to determine whether said tank has a leak.

* * * * *